US012738240B2

(12) United States Patent
Akiyama et al.

(10) Patent No.: US 12,738,240 B2
(45) Date of Patent: Sep. 15, 2026

(54) DISPLAY APPARATUS, PHOTOELECTRIC CONVERSION DEVICE, AND ELECTRONIC EQUIPMENT

(71) Applicant: CANON KABUSHIKI KAISHA, Tokyo (JP)

(72) Inventors: Takahiro Akiyama, Kanagawa (JP); Fumihiro Inui, Kanagawa (JP); Tetsuro Yamamoto, Kanagawa (JP); Takashi Muto, Kanagawa (JP); Shintaro Maekawa, Kanagawa (JP); Akihito Komazawa, Kanagawa (JP); Ryusei Kusuhara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/178,974

(22) Filed: Apr. 15, 2025

(65) Prior Publication Data

US 2025/0336373 A1 Oct. 30, 2025

(30) Foreign Application Priority Data

Apr. 30, 2024 (JP) ................................ 2024-073709

(51) Int. Cl.
*G09G 3/34* (2006.01)

(52) U.S. Cl.
CPC ... *G09G 3/3426* (2013.01); *G09G 2300/0426* (2013.01); *G09G 2310/0286* (2013.01); *G09G 2340/0407* (2013.01); *G09G 2354/00* (2013.01)

(58) Field of Classification Search
CPC .................. G09G 3/34; G09G 3/3426; G09G 2300/0426; G09G 2310/0286; G09G 2340/0407; G09G 2354/00
See application file for complete search history.

(56) References Cited

U.S. PATENT DOCUMENTS 6,781,606 B2 * 8/2004 Jouppi .................. H04N 7/142 715/740
10,475,370 B2 * 11/2019 Spitzer ................ G09G 3/3275
10,909,922 B2 2/2021 Atsuchi
(Continued)

FOREIGN PATENT DOCUMENTS

EP 3923336 A1 12/2021
JP 2013-117553 A 6/2013
(Continued)

OTHER PUBLICATIONS

Jul. 9, 2025 European Official Action in European Patent Appln. No. 25172476.1.

*Primary Examiner* — Olga V Merkoulova
(74) *Attorney, Agent, or Firm* — Venable LLP

(57) ABSTRACT

A display apparatus includes a substrate, a plurality of pixels arranged in a display region on the substrate, and a control circuit configured to control a signal to be supplied to the pixel, wherein the display region includes a first region, and a second region surrounding the first region, a part of the first region is set as a third region changeable in position, the signal to be supplied to the pixel is controlled, so that a display resolution of a fourth region which is not the third region in the first region becomes lower than a display resolution of the third region, and a display resolution of the second region is set to a value equal to or lower than the display resolution of the fourth region by a circuit configuration of the pixel.

19 Claims, 23 Drawing Sheets

(56) References Cited

U.S. PATENT DOCUMENTS

| | | | | |
|---|---|---|---|---|
| 11,062,641 | B2 | 7/2021 | Yamasaki | |
| 11,222,935 | B2 | 1/2022 | Nishimura | |
| 11,495,656 | B2 | 11/2022 | Akiyama | |
| 11,521,540 | B2 | 12/2022 | Muto | |
| 11,600,026 | B2 * | 3/2023 | Martin | H04N 19/96 |
| 11,842,682 | B2 | 12/2023 | Komazawa | |
| 12,020,401 | B2 * | 6/2024 | Martin | G06T 15/005 |
| 12,039,934 | B2 | 7/2024 | Komazawa | |
| 12,075,541 | B2 | 8/2024 | Igarashi | |
| 12,154,492 | B2 | 11/2024 | Muto | |
| 12,176,331 | B2 * | 12/2024 | Plank | H04M 1/0266 |
| 12,277,909 | B2 | 4/2025 | Muto | |
| 12,288,495 | B2 * | 4/2025 | Ryu | G09G 3/20 |
| 12,334,015 | B2 | 6/2025 | Komazawa | |
| 12,462,729 | B2 * | 11/2025 | Bae | G09G 5/227 |
| 2014/0267616 | A1 * | 9/2014 | Krig | H04N 13/271<br>348/46 |
| 2017/0076646 | A1 * | 3/2017 | Gu | H10K 59/1216 |
| 2019/0005920 | A1 * | 1/2019 | Zuo | G09G 5/14 |
| 2019/0172399 | A1 * | 6/2019 | Chen | G09G 3/3225 |
| 2020/0051501 | A1 | 2/2020 | Atsuchi | |
| 2020/0052052 | A1 | 2/2020 | Nishimura | |
| 2022/0093709 | A1 | 3/2022 | Nishimura | |
| 2022/0139319 | A1 * | 5/2022 | Oh | H01L 25/0753<br>345/204 |
| 2022/0149025 | A1 * | 5/2022 | Plank | H04M 1/0266 |
| 2022/0310736 | A1 | 9/2022 | Seo et al. | |
| 2023/0043411 | A1 * | 2/2023 | Igarashi | G09G 3/3275 |
| 2023/0047907 | A1 | 2/2023 | Seto | |
| 2024/0185788 | A1 | 6/2024 | Yamamoto | |
| 2025/0148983 | A1 | 5/2025 | Yamamoto | |
| 2025/0148984 | A1 | 5/2025 | Muto | |
| 2025/0336373 | A1 * | 10/2025 | Akiyama | G09G 3/3233 |

FOREIGN PATENT DOCUMENTS

| | | |
|---|---|---|
| JP | 2020-024914 A | 2/2020 |
| JP | 2020-027270 A | 2/2020 |

* cited by examiner

DISPLAY APPARATUS, PHOTOELECTRIC CONVERSION DEVICE, AND ELECTRONIC EQUIPMENT

BACKGROUND OF THE INVENTION

Field of the Invention

The present invention relates to a display apparatus, a photoelectric conversion device, and electronic equipment.

Description of the Related Art

As display apparatuses each having a liquid crystal display element, or an organic EL display element, there are various display apparatuses having different uses including a large-sized display apparatus such as a digital signage, an intermediate-sized display apparatus such as a note personal computer or a smartphone, a small-sized display apparatus for use in an XR device, and the like. All the display apparatuses have been increased in number of pixels in order to enhance the quality of the display. However, an increase in number of pixels results in an increase in power consumption, or results in an increase in load (amount of operation) of the processing using display data. In order to solve the problems, the development of the technology of display control has been actively performed.

Japanese Patent Application Publication No. 2013-117553 describes that, in a display apparatus including two-dimensionally arrayed display elements, the display element in the peripheral portion is larger than the display element at the center in order to reduce the number of pixels relative to the display area.

Japanese Patent Application Publication No. 2013-117553 describes the technology for reducing the number of pixels. The reduction of the number of pixels can reduce the data amount of the display data (data finally for use in display). However, there is room for improvement in reduction of the data amount in the region with a small pixel.

SUMMARY OF THE INVENTION

The present invention is completed in view of the foregoing problem, and provides a display apparatus further reduced in data amount of the display data (the data finally for use in display).

A display apparatus according to the present invention includes a substrate, a plurality of pixels arranged in a display region on the substrate, and a control circuit configured to control a signal to be supplied to the pixel, wherein the display region includes a first region, and a second region surrounding the first region, a part of the first region is set as a third region changeable in position, the signal to be supplied to the pixel is controlled, so that a display resolution of a fourth region which is not the third region in the first region becomes lower than a display resolution of the third region, and a display resolution of the second region is set to a value equal to or lower than the display resolution of the fourth region by a circuit configuration of the pixel.

Further features of the present invention will become apparent from the following description of exemplary embodiments with reference to the attached drawings.

DESCRIPTION OF THE EMBODIMENTS

Embodiment 1

Figure 1:
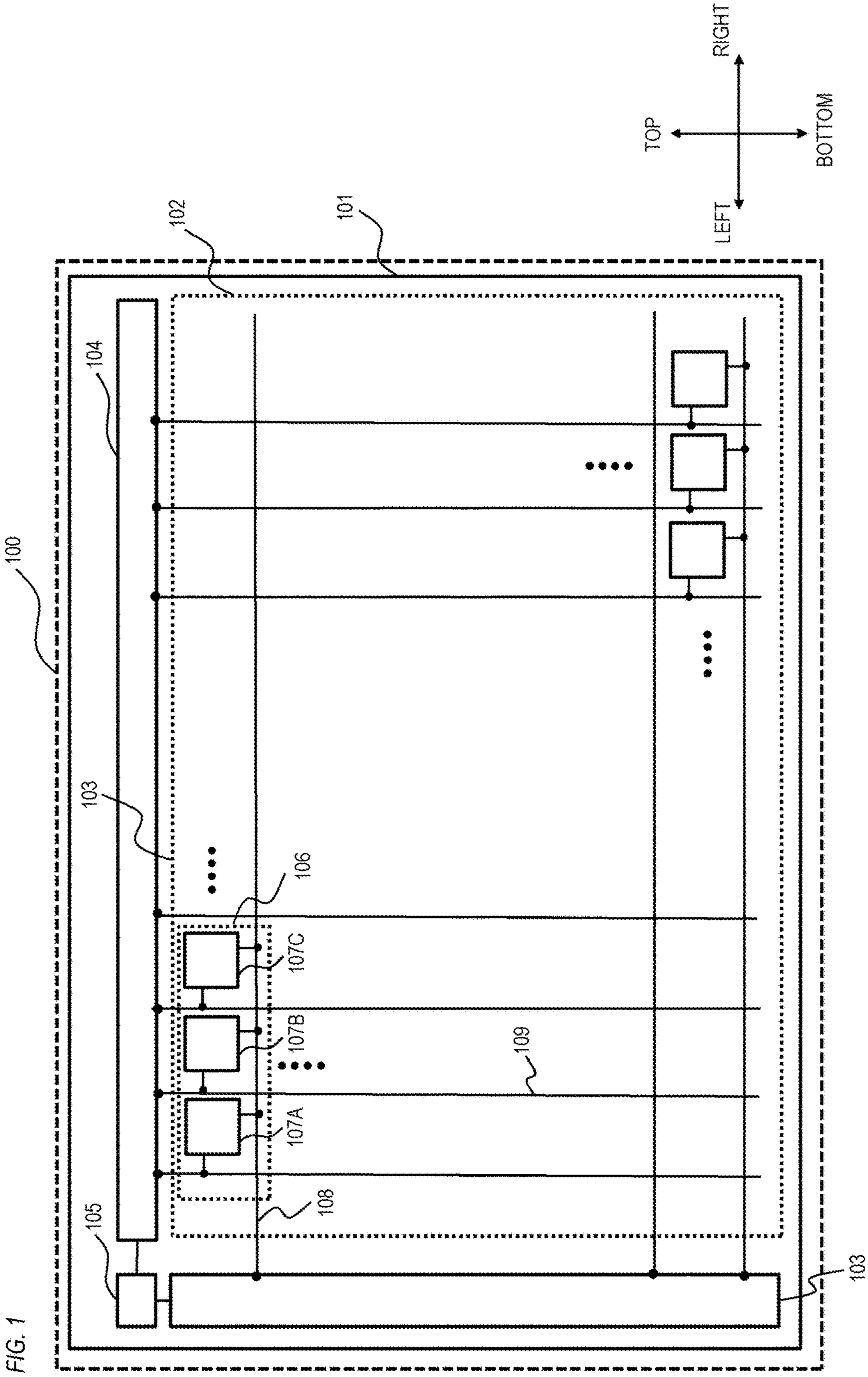
FIG. 1 is a schematic view showing one example of a display apparatus.

Below, Embodiment 1 of the present invention will be described. FIG. 1 is a schematic view showing one example of a display apparatus in accordance with Embodiment 1. A display apparatus 100 has a substrate 101, a pixel array portion 102, a vertical scanning circuit 103, a signal output circuit 104, and a control circuit 105. The pixel array portion 102, the vertical scanning circuit 103, the signal output circuit 104, and the control circuit 105 are provided on the substrate 101.

The pixel array portion 102 has a plurality of pixels 106. The region including the plurality of pixels 106 arranged therein functions as a display region for displaying a picture. Each pixel 106 has a sub-pixel 107A for performing display of red (R), a sub-pixel 107B for performing display of green (G), and a sub-pixel 107C for performing display of blue (B). Hereinafter, the sub-pixels 107A to 107C are each described as a sub-pixel 107 without distinction. Incidentally, each pixel 106 may have 3 or more sub-pixels 107. The size of each pixel 106 and the size of each sub-pixel 107 have no particular restriction. In Embodiment 1, the size of one pixel 106 and the size of one sub-pixel 107 vary according to the position in the display region. The details thereof will be described later.

The vertical scanning circuit 103 and the plurality of sub-pixels 107 are connected to each other by a plurality of scanning lines 108 (vertical scanning signal lines). The vertical scanning circuit 103 switches between the scanning lines 108 for supplying a scanning signal (vertical scanning signal) out of the plurality of scanning lines 108, and scans (successively selects) the plurality of sub-pixels 107 in the vertical direction (from top to bottom or from bottom to top). For example, the vertical scanning circuit 103 is configured using a shift register for sequentially shifting (transferring) a start pulse in synchronism with a clock pulse. The scanning line 108 includes a light-emitting control line and a write control line described later.

The signal output circuit 104 and the plurality of sub-pixels 107 are connected with each other by a plurality of signal lines 109 (horizontal scanning signal lines). The signal output circuit 104 supplies a signal (a horizontal scanning signal or a voltage) according to image data to the plurality of signal lines 109, thereby supplying the signal to the sub-pixel 107 selected by the vertical scanning circuit 103. As a result of this, the sub-pixel 107 selected by the vertical scanning circuit 103 emits a light with the brightness according to the image data. By sequentially causing the plurality of sub-pixels 107 to emit a light while scanning, a picture is displayed.

The control circuit 105 controls the signal to be supplied to each pixel via the vertical scanning circuit 103 and the signal output circuit 104 on the basis of the image data, or the like.

Figure 2B:
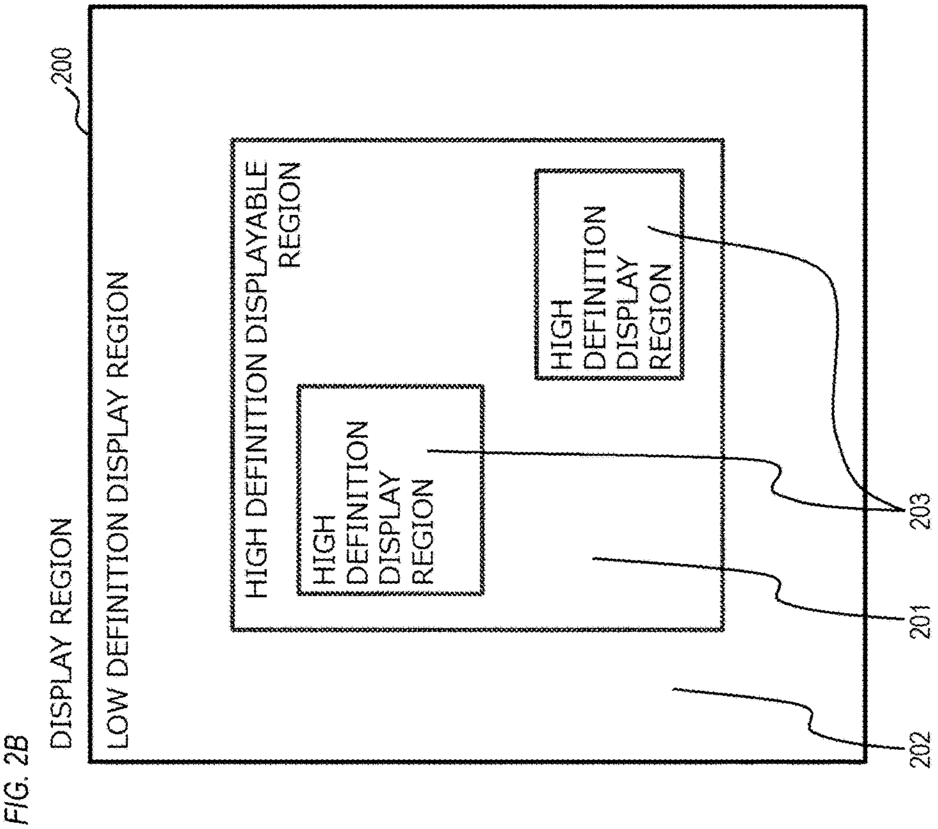
FIGS. 2A and 2B are each a schematic view showing one example of a display region.
Figure 2A:
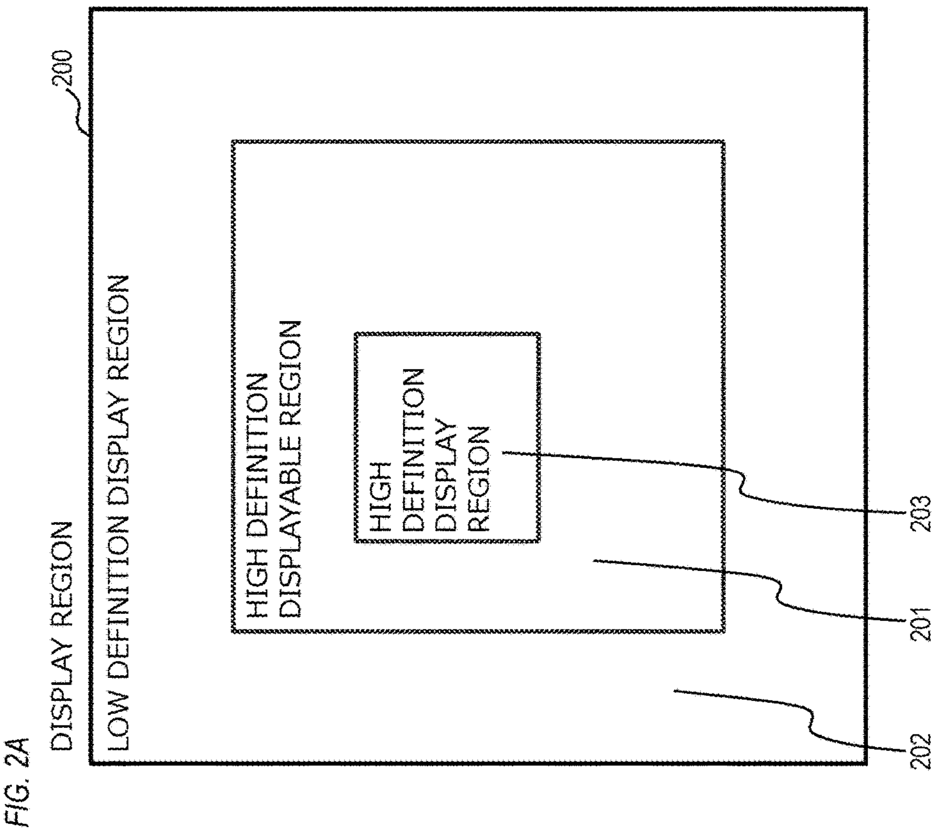

FIGS. 2A and 2B are each a schematic view showing one example of a display region in accordance with Embodiment 1. A display region 200 includes a high definition displayable region 201, and a low definition display region 202 surrounding the high definition displayable region 201. In Embodiment 1, a part of the high definition displayable region 201 is set as a high definition display region 203. For example, the region to which the line of sight of a user looking at the picture is directed may be set as the high definition display region 203 on the basis of the detection result of a line-of-sight detection portion for detecting the line of sight of a user. The region where a predetermined object such as the face of a person or a traffic sign in the image (picked-up image) picked up (captured) by the image pick-up portion (imaging portion) is displayed may be set as the high definition display region 203. The region specified on the basis of the region specifying portion having information specified by the creator of the picture or a user may be set as the high definition display region 203. As shown in FIG. 2A, one high definition display region 203 may be set. Alternatively, as shown in FIG. 2B, a plurality of high definition display regions 203 may be set. The position, the size, and the number of the high definition display regions 203 can be changed.

Incidentally, the high definition display region 203 may be set at the display apparatus 100 (the control circuit 105), or may be set at an external device (e.g., an external device for generating image data to be displayed) of the display apparatus 100. The line-of-sight detection portion, the image pick-up portion, the region specifying portion, or the like may be set at the display apparatus 100, or may be an external device of the display apparatus 100. The method for detecting the line of sight has no particular restriction. For example, the line of sight may be detected on the basis of the positional relationship between the pupil and the Purkinje image in the image obtained by picking up the eyes of a user. The method for detecting a predetermined object from the picked-up image also has no particular restriction. For example, a predetermined object may be detected by template matching. Alternatively, a predetermined object may be detected by a discrimination circuit using a learned model. The discrimination circuit assumes, for example, the image data as an input, and the coordinates data indicative of the region of a predetermined object as an output.

Figure 3C:
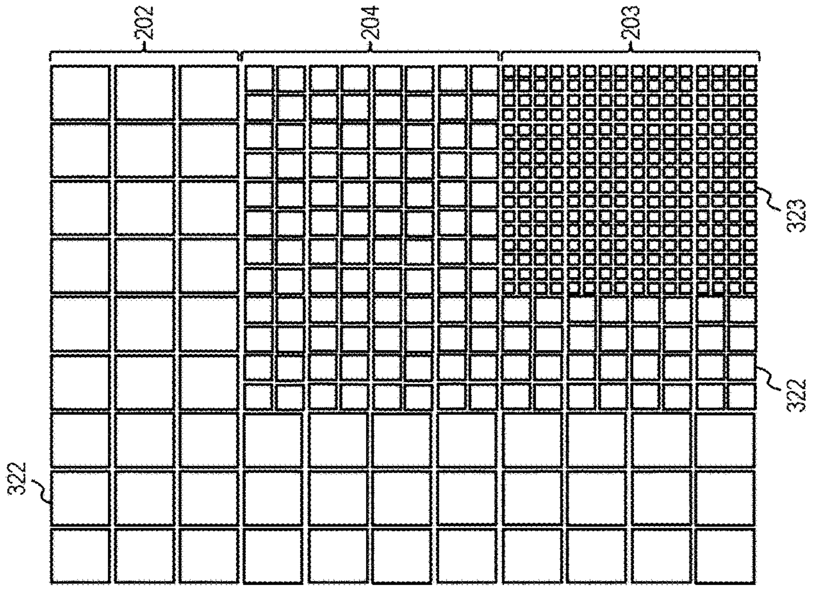
FIG. 3C is a schematic view showing one example of the arrangement of sub-pixels.

In Embodiment 1, each sub-pixel 107 has one or more light-emitting elements. FIG. 3A is a schematic view showing one example of the arrangement of light-emitting elements in accordance with Embodiment 1. As shown in FIG. 3A, a plurality of light-emitting elements 301 are arranged two-dimensionally (in a matrix) and uniformly. The light-emitting element 301 is, for example, an organic light-emitting element. The plurality of light-emitting elements 301 includes a light-emitting element for emitting a red (R) light, a light-emitting element for emitting a green (G) light, and a light-emitting element for emitting a blue (B) light. The sub-pixel 107A of R has one or more light-emitting elements of R, and the sub-pixel 107B of G has one or more light-emitting elements of G, and the sub-pixel 107C of B has one or more light-emitting elements of B. With regard to each of R, G, and B, the sizes of the light-emitting regions of the light-emitting element 301 are substantially equal to one another. Among R, G, and B, the sizes of the light-emitting regions of the light-emitting element 301 may be set equal, or may be set different. In each sub-pixel, it is more preferable that the light-emitting regions are combined. Herein, the size of the light-emitting region may be the area of the light-emitting region, and the area of the light-emitting region may be, for example, the size of the opening of a pixel isolation layer. Further, "being substantially equal" includes "may be vary within the range of a manufacturing error", and includes "being substantially equal".

Figure 3B:
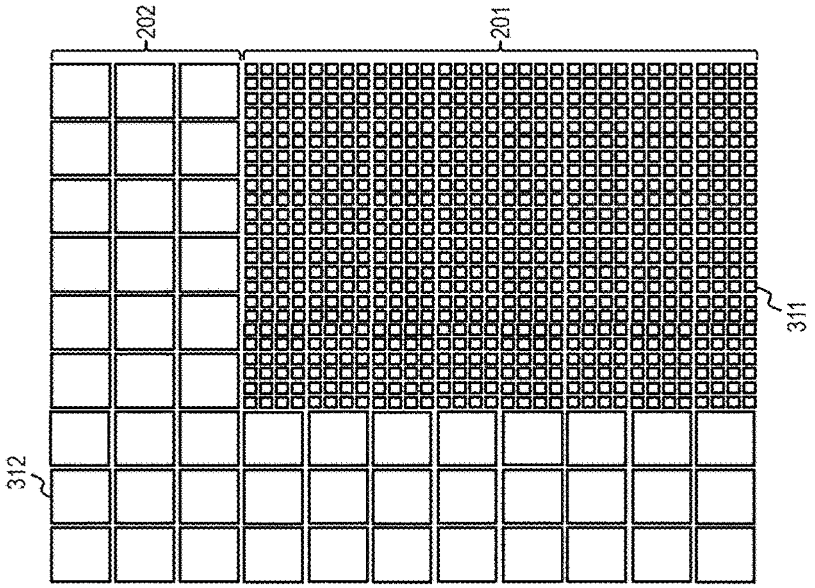
FIG. 3B is a schematic view showing one example of the arrangement of sub-pixel circuits.
Figure 3A:
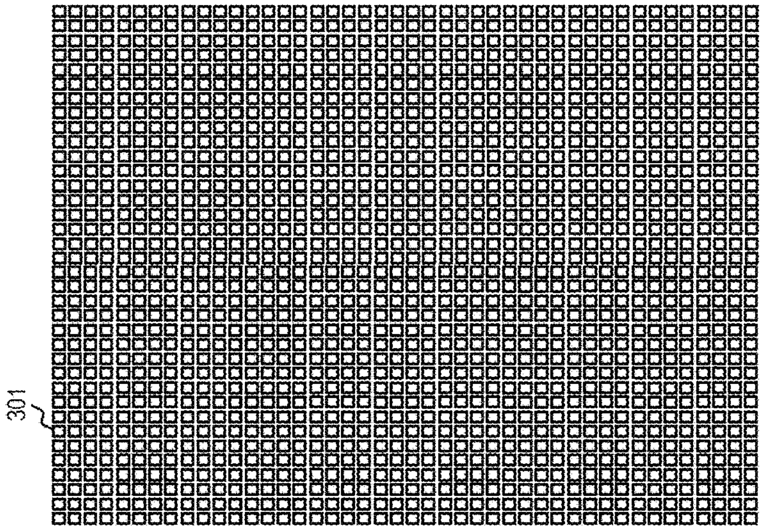
FIG. 3A is a schematic view showing one example of the arrangement of light-emitting elements.

FIG. 3B is a schematic view showing one example of the arrangement of a sub-pixel circuit (a circuit of the sub-pixel 107) in accordance with Embodiment 1. In the high definition displayable region 201, a small sub-pixel circuit 311 is used in order to enable high definition display. In the low definition display region 202, it is essential only that low definition display can be performed. For this reason, a large sub-pixel circuit 312 is used. The high definition displayable region 201 including the small sub-pixel circuits arranged therein is the region with a higher density of sub-pixel circuits than that of the low definition display region 202, and is the region with a smaller pitch of a write transistor described later than that of the low definition display region 202. The density of the sub-pixel circuits can be estimated by, for example, the number of the transistors per area in a plan view, and may be estimated by the number of the write transistors. The pitch of the write transistors may be the pitch in either direction of the row direction and the column direction in the array direction of the light-emitting elements 301. The low definition display region 202 including large sub-pixel circuits arranged therein is the region with a lower density of the sub-pixel circuits than that of the high definition displayable region 201, and is the region with a larger pitch of the write transistors than that of the high definition displayable region 201. The number of the light-emitting elements 301 possessed by the sub-pixel circuit 312 of the low definition display region 202 is larger than the number of the light-emitting elements 301 possessed by the sub-pixel circuit 311 of the high definition displayable region 201. In other words, when, in the high definition display region, the number of the light-emitting elements 301 connected with one sub-pixel circuit is 1, the number of the light-emitting elements 301 connected with one sub-pixel circuit in the low definition display region is 2 or more. Incidentally, it is essential only that there is the region where the number of the light-emitting elements 301 possessed by the sub-pixel circuit 312 of the low definition display region 202 is larger than the number of the light-emitting elements 301 possessed by the sub-pixel circuit 311 of the high definition displayable region 201. There may also be the region where the number of the light-emitting elements 301 possessed by the sub-pixel circuit 312 of the low definition display region 202 is equal to the number of the light-emitting elements 301 possessed by the sub-pixel circuit 311 of the high definition displayable region 201.

FIG. 3C is a schematic view showing one example of the arrangement of sub-pixels in a display picture in accordance with Embodiment 1. In the low definition display region 202, a large sub-pixel 322 corresponding to a large sub-pixel circuit 312 is displayed. Control of the control circuit 105 individually supplies a signal (a horizontal scanning signal or a voltage) according to image data to the adjacent sub-pixel circuits 311 in the high definition display region 203. For this reason, a small sub-pixel 323 corresponding to a small sub-pixel circuit 311 is displayed. Then, control of the control circuit 105 supplies the same signal (horizontal scanning signal or voltage) according to the image data to the adjacent sub-pixel circuits 311 in the region (non-high definition display region 204) that is not the high definition display region 203 in the high definition displayable region 201. For this reason, display is performed as if a plurality of sub-pixels corresponding to a plurality of sub-pixel circuits 311 are one sub-pixel. Incidentally, the size of the light-emitting region of the sub-pixel in the low definition display region 202 may be the same as, or different from the size of the light-emitting region in the region displayed as one sub-pixel in the non-high definition display region 204. The size of the light-emitting region of the sub-pixel in the low definition display region 202 may be larger than the size of the light-emitting region in the region displayed as one sub-pixel in the non-high definition display region 204.

As the description referring to FIGS. 3A to 3C, a description has been given by focusing attention on the sub-pixel 107. However, each pixel 106 has a plurality of sub-pixels 107. For this reason, the same description as that regarding the sub-pixel 107 is also applicable to the pixel 106.

Thus, by controlling the signal (the horizontal scanning signal or the voltage) to be supplied to the pixel, the display resolution of the non-high definition display region 204 is made lower than the display resolution of the high definition display region 203. Then, with the circuit configuration of the pixel, the display resolution of the low definition display region 202 is made equal to or lower than the display resolution of the non-high definition display region 204. By dividing the display region into 3 or more regions, and determining the display resolution of each region by the circuit configuration and signal control, it is possible to provide a display apparatus further reduced in data amount of the display data (the data finally for use in display).

Figure 4B:
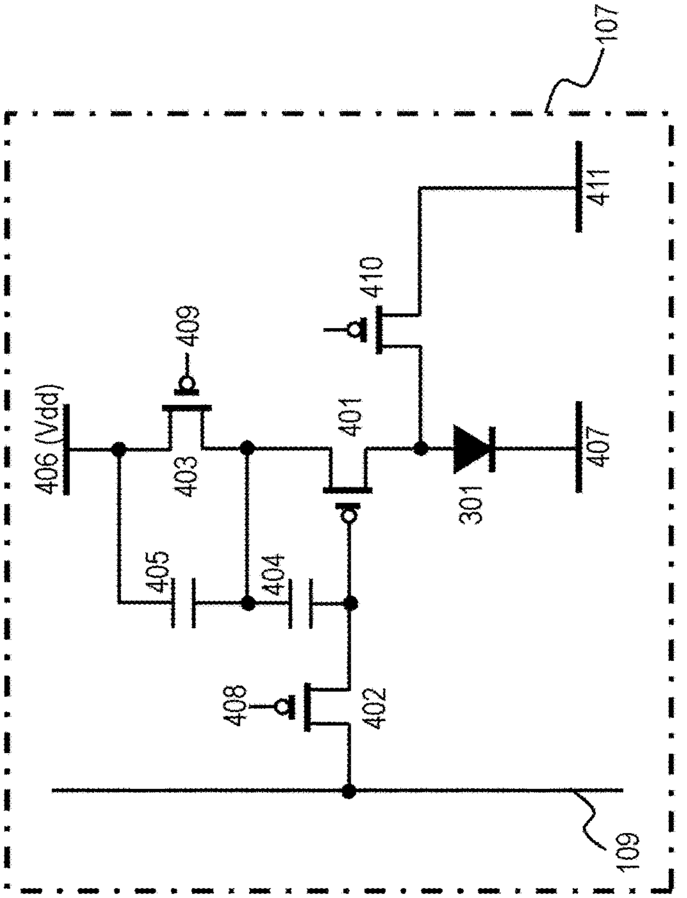
FIGS. 4A and 4B are each a circuit diagram showing one example of the basic configuration of a sub-pixel circuit.
Figure 4A:
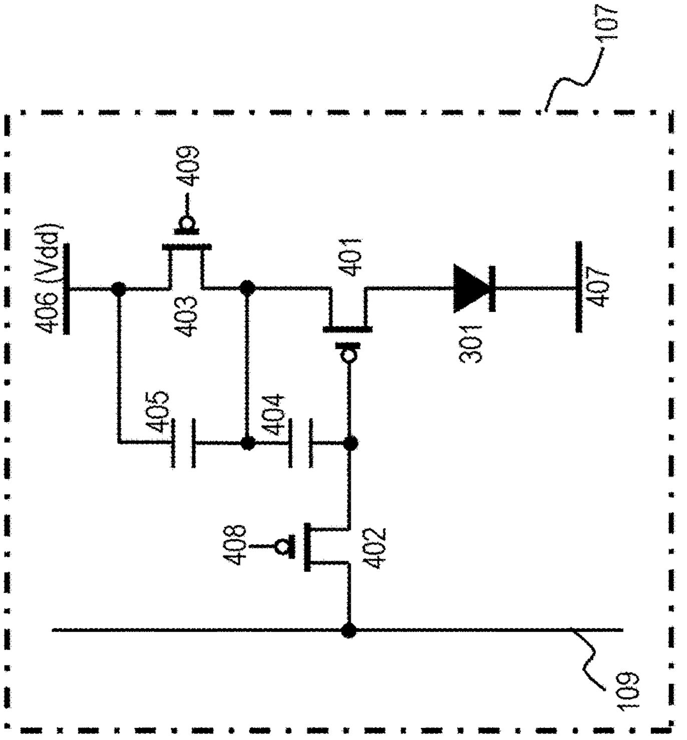

FIG. 4A is a circuit diagram showing one example of the basic configuration of the sub-pixel 107 (the sub-pixel circuit) in accordance with Embodiment 1. As shown in FIG. 4A, the sub-pixel 107 has a light-emitting element 301, a driving transistor 401, a writing transistor 402, a light-emitting control transistor 403, a first capacitance element 404, and a second capacitance element 405. Incidentally, the total number of the transistors and the capacitance elements and the combination of the conductivity type of each transistor are strictly merely one example, and are not limited to the present configuration.

One (herein, the drain) of the source and the drain of the driving transistor 401 is connected with the first electrode of the light-emitting element 301. The other (herein, the source) of the source and the drain of the driving transistor 401 is connected with one (herein, the drain) of the source and the drain of the light-emitting control transistor 403. The other (herein, the source) of the source and the drain of the light-emitting control transistor 403 is connected with the node to which a power supply voltage is supplied. In FIG. 4A, the source of the light-emitting control transistor 403 is connected with a first power supply terminal 406 (below, Vdd). The light-emitting control transistor 403 can function as a switch for connecting the source of the driving transistor 401 to the Vdd 406. The second electrode of the light-emitting element 301 is connected with a second power supply terminal 407 (below, Vss). One (herein, the source) of the source and the drain of the writing transistor 402 is connected with the gate of the driving transistor 401, and the other (herein, the drain) of the source and the drain of the writing transistor 402 is connected with the signal line 109. The writing transistor 402 can function as a switch for connecting the gate of the driving transistor 401 to the signal line 109.

The gate of the writing transistor 402 is connected with the write control line 408 in the scanning line 108. The gate of the light-emitting control transistor 403 is connected with the light-emitting control line 409 in the scanning line 108.

The first capacitance element 404 is connected with between the gate of the driving transistor 401 and one (herein, the source) of the source and the drain of the driving transistor 401. The second capacitance element 405 is connected with between one (herein, the source) of the source and the drain of the driving transistor 401 and the Vdd 406. The first capacitance element 404 and the second capacitance element 405 are both connected with the source of the driving transistor 401. The first capacitance element 404 and the second capacitance element 405 each may be a parasitic capacitance, or may be the capacitance having a MIM (Metal-Insulator-Metal) structure.

The outline regarding the operation during the light-emitting period in which the light-emitting element 301 emits a light will be described below. The driving transistor 401 supplies a current to the light-emitting element 301 from the Vdd 406, and causes the light-emitting element 301 to emit a light. For example, the driving transistor 401 supplies a current according to the voltage (the horizontal scanning signal) possessed by the signal line 109 to the light-emitting element 301. Thus, the light-emitting element 301 is caused to emit a light by current driving.

When the light-emitting element 301 emits a light, the writing transistor 402 responds to the scanning signal (the write control signal) to be applied to the gate via the write control line 408 from the vertical scanning circuit 103, and is rendered in a conduction state. As a result of this, the writing transistor 402 writes the voltage (the horizontal scanning signal) to be supplied from the signal output circuit 104 via the signal line 109 on the sub-pixel 107. The written voltage is applied to the gate of the driving transistor 401. The voltage (the horizontal scanning signal) supplied from the signal output circuit 104 will be hereinafter described as Vsig.

The light-emitting control transistor 403 responds to the scanning signal (the light-emitting control signal) to be supplied from the vertical scanning circuit 103 via the light-emitting control line 409, and is rendered in a conduction state. This allows the current supply from the Vdd 406 to the driving transistor 401. As a result of this, light emission of the light-emitting element 301 by the driving transistor 401 becomes possible. Namely, the light-emitting control transistor 403 has a function as a transistor for controlling the light emission and the non-light emission of the light-emitting element 301. Thus, the switching operation of the light-emitting control transistor 403 can control the proportions of the light emission period and the non-light emission period of the light-emitting element 301. As a result of this, it is possible to reduce the afterimage associated with the light emission of the sub-pixel 107 in the light emission period during 1 frame period, particularly, the image quality at the time of displaying a moving image can be improved. The proportions of light emission and non-light emission during 1 frame may be controlled, thereby achieving so-called duty control, or an aspect in which the timing of light emission is controlled is also acceptable.

By changing the amount of the current flowing through the driving transistor 401, it is possible to change the light emission brightness of the light-emitting element 301. The capacity between the first electrode (herein, the anode) and the second electrode (herein, the cathode) of the light-emitting element 301 is charged to a predetermined potential. The current according to the potential difference is passed through the light-emitting element 301. As a result of this, the light-emitting element 301 emits a light with a predetermined brightness.

The threshold value voltage of the driving transistor 401 may vary among the sub-pixels 107 due to the variation in manufacturing. When the same Vsig is written with respect to a plurality of sub-pixels 107 of the same luminescent color, the amount of the current flowing through the driving transistor 401 is different for each sub-pixel 107, so that the light emission amount varies. Thus, there is performed a so-called threshold value correction operation in which before applying the Vsig to the gate of the driving transistor 401, the threshold value voltage of the driving transistor 401 is held in the first capacitance element 404 between the gate and the source of the driving transistor 401. The threshold value correction operation can reduce the variation in current amount of the driving transistor 401 in each sub-pixel 107.

Incidentally, the basic configuration of the sub-pixel 107 may be the configuration of FIG. 4B. In FIG. 4B, a reset transistor 410 is added. One of the source and the drain of the reset transistor 410 is connected with the first electrode of the light-emitting element 301, and the other of the source and the drain of the reset transistor 410 is connected with the third power supply terminal 411. The third power supply terminal 411 may be equal to, or may have the same potential as that of the second power supply terminal 407, or may be grounded. The gate of the reset transistor 410 is connected with the vertical scanning circuit 103, so that a control signal from the vertical scanning circuit 103 controls the switching operation (ON (conduction)/OFF (non-conduction)) of the reset transistor 410. When the reset transistor 410 is in an ON state, a current does not flow through the light-emitting element 301, so that the light-emitting element 301 does not emit a light. For this reason, provision of the reset transistor 410 can suppress the flow of an unnecessary current through the light-emitting element 301, which can suppress the reduction of the contrast of the display picture.

Figure 5:
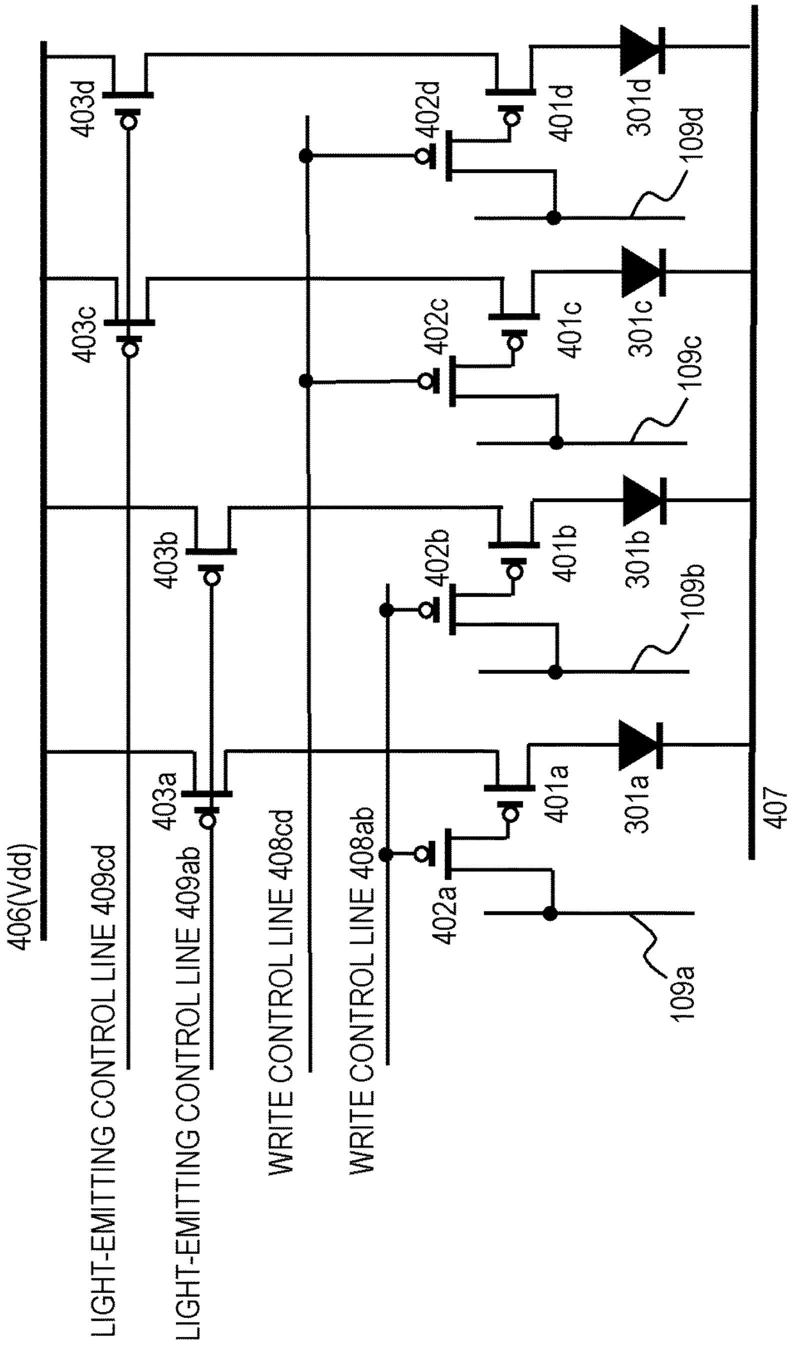
FIG. 5 is a circuit diagram showing one example of a configuration of a sub-pixel circuit in a high definition displayable region.

FIG. 5 is a circuit diagram showing one example of a configuration of a small sub-pixel circuit 311 in the high definition displayable region 201. FIG. 5 shows a total of four sub-pixel circuits 311 of two in the horizontal direction (row direction)×two in the vertical direction (column direction). In FIG. 5, some constituent elements of the sub-pixel circuit 311 such as the first capacitance element 404 and the second capacitance element 405 are omitted.

The number of the light-emitting elements 301 possessed by the sub-pixel circuit 311 has no particular restriction. In FIG. 5, one sub-pixel circuit 311 has one light-emitting element 301. For this reason, the signal lines 109*a* to 109*d* are connected with their corresponding mutually close light-emitting elements 301*a* to 301*d*, respectively (indirectly). The signal line 109*a* is connected with the drain of the writing transistor 402*a* corresponding to the light-emitting element 301*a*, and the signal line 109*b* is connected with the drain of the writing transistor 402*b* corresponding to the light-emitting element 301*b*. Similarly, the signal line 109*c* is connected with the drain of the writing transistor 402*c* corresponding to the light-emitting element 301*c*, and the signal line 109*d* is connected with the drain of the writing transistor 402*d* corresponding to the light-emitting element 301*d*. When a signal line is connected with a transistor, the connection may be achieved via another element so long as an electric connection is established. The same also applies to the following other connections.

Incidentally, for easy understanding, all the signal lines 109*a* to 109*d* are described separately. However, the light-emitting element 301*a* and the light-emitting element 301*c* are the light-emitting elements 301 of the same column. For this reason, the signal line 109*a* and the signal line 109*c* connected therewith are the same signal lines 109. Similarly, the light-emitting element 301*b* and the light-emitting element 301*d* are the light-emitting elements 301 of the same column. For this reason, the signal line 109*b* and the signal line 109*d* connected therewith are the same signal lines 109.

In FIG. 5, the two light-emitting control lines 409*ab* and 409*cd* are used. The light-emitting control line 409*ab* is connected with the light-emitting elements 301*a* and 301*b* of the same row (indirectly), and the light-emitting control line 409*cd* is connected with the light-emitting elements 301*c* and 301*d* of the same row (indirectly). The light-emitting control line 409*ab* is connected with the gates of the light-emitting control transistors 403*a* and 403*b* corresponding to the light-emitting elements 301*a* and 301*b*, respectively. The light-emitting control line 409*cd* is connected with the gates of the light-emitting control transistors 403*c* and 403*d* corresponding to the light-emitting elements 301*c* and 301*d*, respectively.

In FIG. 5, the two write control lines 408*ab* and 408*cd* are used. The write control line 408*ab* is connected with the light-emitting elements 301_a_ and 301_b_ of the same row (indirectly), and the write control line 408_cd_ is connected with the light-emitting elements 301_c_ and 301_d_ of the same row (indirectly). The write control line 408_ab_ is connected with the gates of the writing transistors 402_a_ and 402_b_ corresponding to the light-emitting elements 301_a_ and 301_b_, respectively. The write control line 408_cd_ is connected with the gates of the writing transistors 402_c_ and 402_d_ corresponding to the light-emitting elements 301_c_ and 301_d_, respectively.

The source of the writing transistor 402_a_ is connected with the gate of the driving transistor 401_a_ corresponding to the light-emitting element 301_a_, and the source of the writing transistor 402_b_ is connected with the gate of the driving transistor 401_b_ corresponding to the light-emitting element 301_b_. Similarly, the source of the writing transistor 402_c_ is connected with the gate of the driving transistor 401_c_ corresponding to the light-emitting element 301_c_. Then, the source of the writing transistor 402_d_ is connected with the gate of the driving transistor 401_d_ corresponding to the light-emitting element 301_d_.

Figure 6:
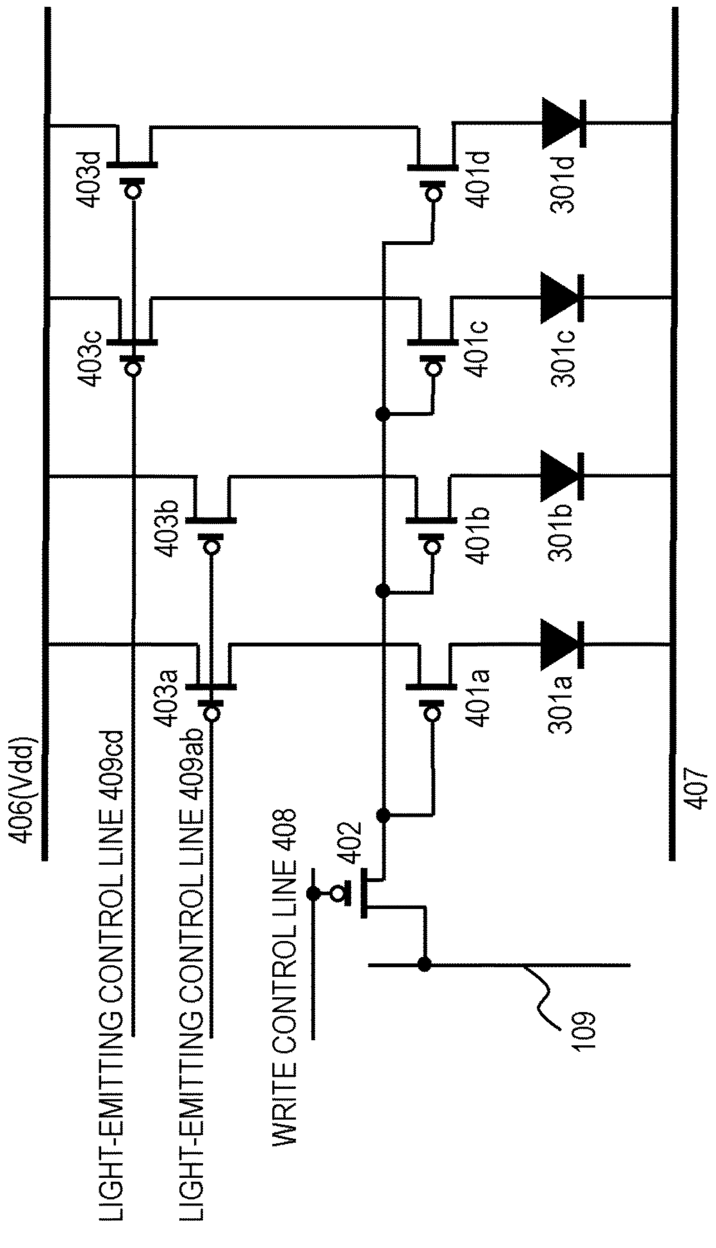
FIG. 6 is a circuit diagram showing one example of a configuration of sub-pixel circuit in a low definition display region.

FIG. 6 is a circuit diagram showing one example of the configuration of a large sub-pixel circuit 312 in the low definition display region 202. The number of the light-emitting elements 301 possessed by the sub-pixel circuit 312 has no particular restriction. In FIG. 6, one sub-pixel circuit 312 has four light-emitting elements 301_a_ to 301_d_ in proximity to each other. In FIG. 6, one sub-pixel circuit 312 has the same size as that of a total of four sub-pixel circuits 311 of two in the horizontal direction×two in the vertical direction in the high definition displayable region 201.

In FIG. 6, as in FIG. 5, the two light-emitting control lines 409_ab_ and 409_cd_ are used. Incidentally, the number of the light-emitting control lines 409 possessed by the sub-pixel circuit 312 has no particular restriction. For example, one light-emitting control line 409 connected with the light-emitting elements 301_a_ to 301_d_ (indirectly) may be used. With this configuration, it becomes possible to light on the light-emitting elements 301_a_ to 301_d_ at the same time. Further, by reducing the number of the light-emitting control lines 409, it is possible to reduce the power consumption. Incidentally, although described in detail later, even when the two light-emitting control lines 409_ab_ and 409_cd_ are used, it becomes possible to light up the light-emitting elements 301_a_ to 301_d_ at the same time by the configuration of the vertical scanning circuit 103, or the switching operation in the vertical scanning circuit 103.

In FIG. 6, one signal line 109 is connected with the light-emitting elements 301_a_ to 301_d_ (indirectly). In FIG. 6, one writing transistor 402 is used. For this reason, the number of the write control lines 408 used is also 1, and the same write control line 408 is connected to the light-emitting elements 301_a_ to 301_d_ (indirectly). The signal line 109 is connected with the drain of the writing transistor 402, and the source of the writing transistor 402 is connected with the gates of the driving transistors 401_a_ to 401_d_ corresponding to the light-emitting elements 301_a_ to 301_d_, respectively. By reducing the number of the signal lines 109 and the write control lines 408, it is possible to reduce the power consumption.

Figure 7:
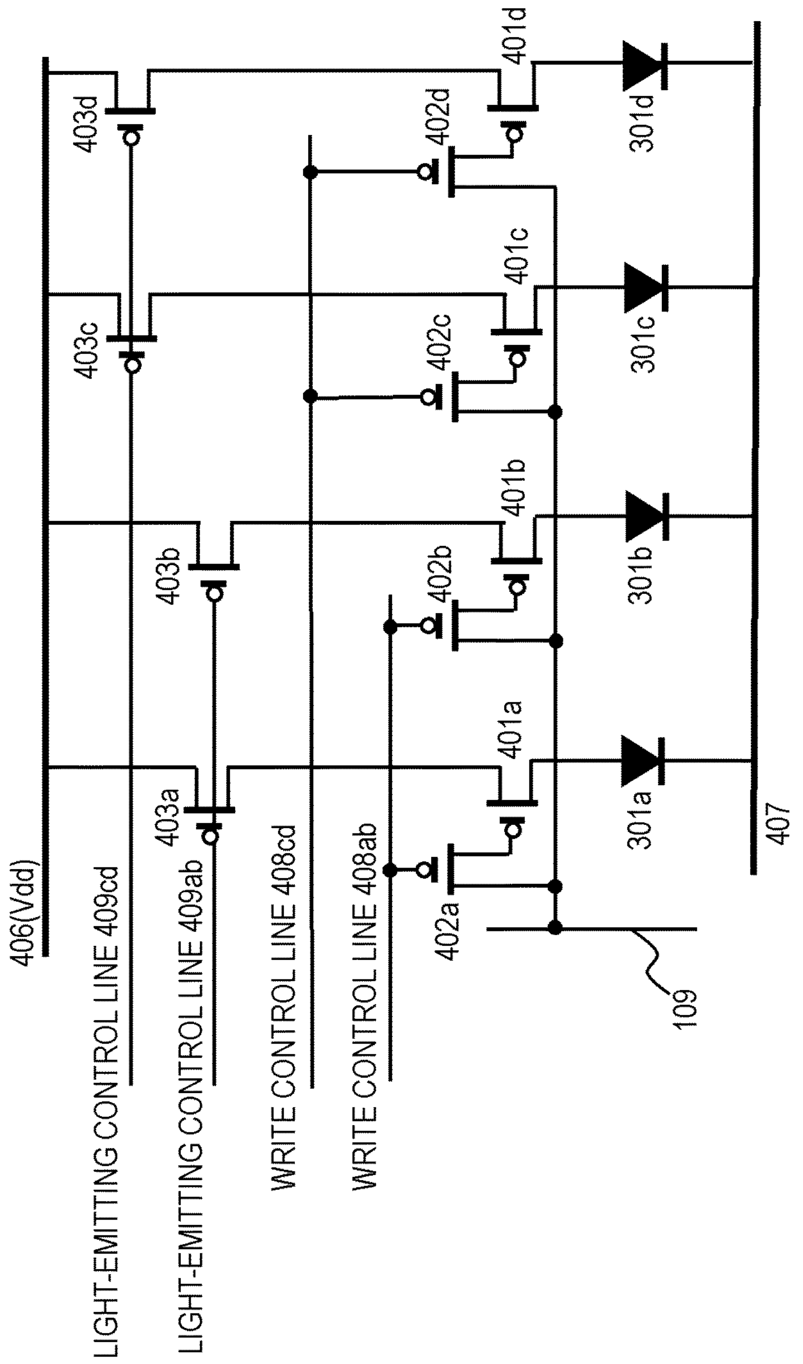
FIG. 7 is a circuit diagram showing a modified example of a configuration of a sub-pixel circuit in a low definition display region.

FIG. 7 is a circuit diagram showing a modified example of the configuration of a large sub-pixel circuit 312 in the low definition display region 202. In FIG. 7, as in FIG. 6, one sub-pixel circuit 312 has the same size as that of a total of four sub-pixel circuits 311 of two in the horizontal direction×two in the vertical direction in the high definition displayable region 201. Further, in FIG. 7, as in FIG. 6, the two light-emitting control lines 409_ab_ and 409_cd_ are used.

In FIG. 7, as in FIG. 6, one signal line 109 is connected with the light-emitting elements 301_a_ to 301_d_ (indirectly). However, the connection destination of the signal line 109 varies between FIGS. 6 and 7. In FIG. 7, as in FIG. 5, the two write control lines 408_ab_ and 408_cd_, and the four writing transistors 402_a_ to 402_d_ are used. The signal line 109 is connected with the drain of the writing transistors 402_a_ to 402_d_.

FIGS. 5 and 7 are the same with each other in terms of the number of the writing transistors 402, the number of the light-emitting control transistors 403, the number of the write control lines 408, and the number of the light-emitting control lines 409. By making the configuration of the large sub-pixel circuit 312 in the low definition display region 202 more similar to the configuration of the small sub-pixel circuit 311 in the high definition displayable region 201, it is possible to make the characteristics of the sub-pixel circuit 312 more similar to the characteristics of the sub-pixel circuit 311. As a result, it is possible to mitigate the change in display characteristics at the boundary portion between the low definition display region 202 and the high definition displayable region 201.

Incidentally, out of the plurality of sub-pixel circuits 312 in the low definition display region 202, in each sub-pixel circuit 312 arranged in the direction vertical to (upward of, or downward of) the high definition displayable region 201, the signal line 109 to be connected to the sub-pixel circuit 311 of the high definition displayable region 201 can be used. The sub-pixel circuit 312 arranged in the direction vertical to the high definition displayable region 201 may be understood as the sub-pixel circuit 312 whose position in the horizontal direction is within the region of the high definition displayable region 201.

For this reason, the configuration of the sub-pixel circuit 312 arranged in the direction vertical to the high definition displayable region 201 may be the configuration of FIG. 5. In this case, the same signals (Vsig) according to the image data are supplied to the light-emitting elements 301_a_ to 301_d_ possessed by the sub-pixel circuit 312. By setting the configuration of the sub-pixel circuit 312 arranged in the direction vertical to the high definition displayable region 201 as the configuration of FIG. 5, it is possible to reduce the variation in length (load carrying capacity) of the signal line 109 within the region in the horizontal direction where the high definition displayable region 201 is present. Furthermore, it is possible to reduce the variation in display characteristics in the high definition displayable region 201, which can improve the quality of the display picture.

Figure 8B:
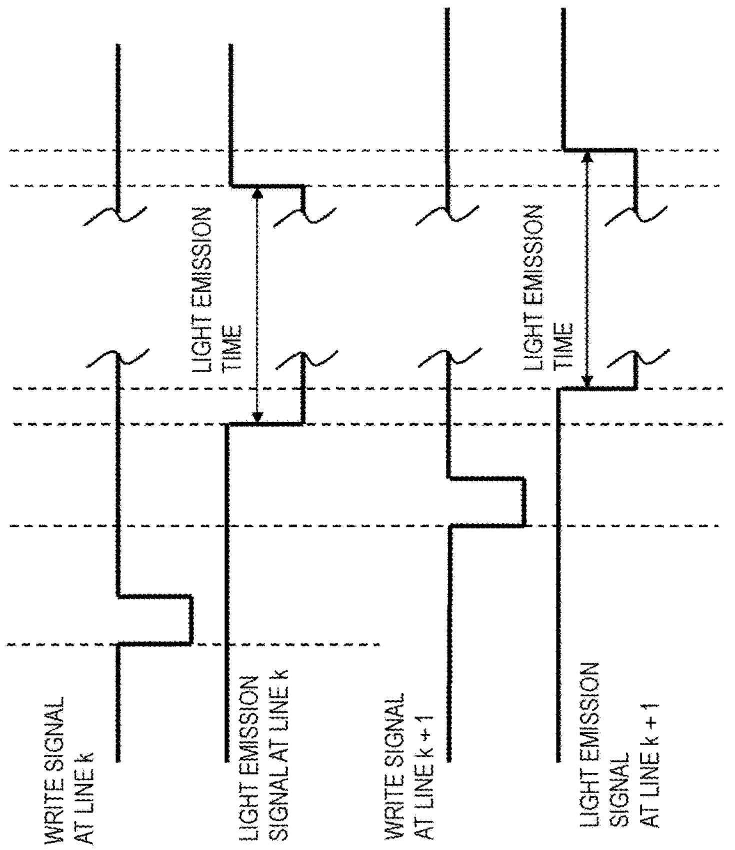
FIGS. 8A and 8B are each a timing chart showing one example of writing and light emission.
Figure 8A:
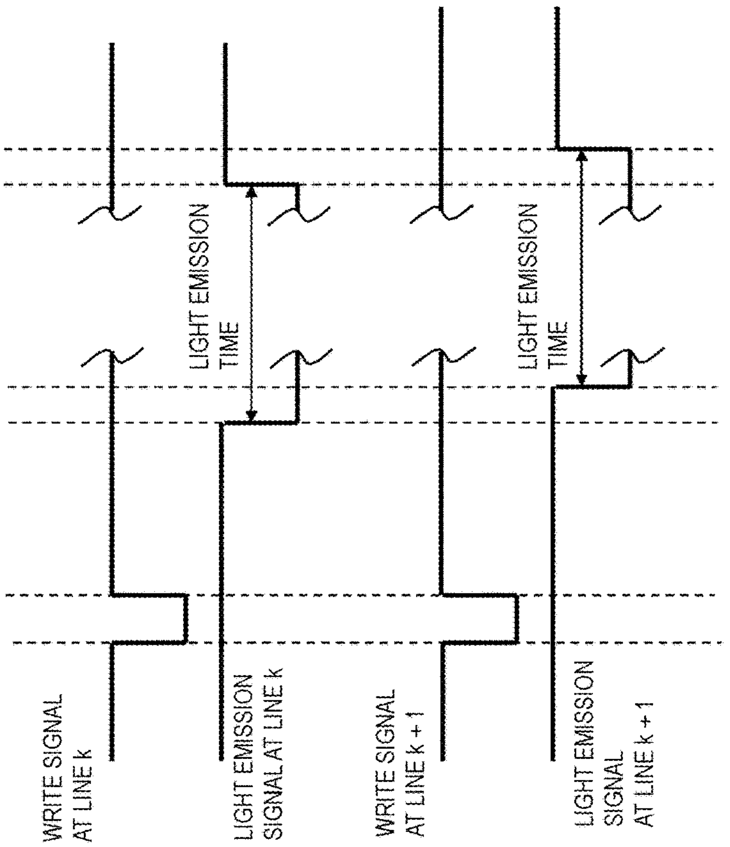

FIG. 8A is a timing chart showing one example of the timing for supplying a write control signal and the timing for supplying a light-emitting control signal. FIG. 8A is a timing chart corresponding to the sub-pixel circuit 311 in which the high definition display region 203 is not present in the row direction out of the plurality of sub-pixels circuits 311 in the non-high definition display region 204. In FIG. 8A, it is assumed that the same signals (Vsig) according to the image data are supplied to the sub-pixel circuit 311 at line k and the sub-pixel circuit 311 at line k+1. In FIG. 8A, the write control signals are supplied at the same timing to the sub-pixel circuit 311 at line k and the sub-pixel circuit 311 at line k+1.

Thus, the write control signals for the light-emitting elements 301 of a plurality of rows where no high definition display region 203 is present in the row direction are supplied at the same timing. The region where no high definition display region 203 is present in the row direction in the low definition display region 202 may be controlled similarly. By doing this, it is possible to hasten the supply of the write control signal, and it is possible to suppress the reduction of the frame rate due to an increase in number of pixels. As a result, it becomes possible to achieve a higher frame rate.

Incidentally, the light-emitting control signals for the light-emitting elements 301 of a plurality of rows where no high definition display region 203 is present in the row direction may be supplied at the same timing (period). This also enables a higher frame rate.

FIG. 8B is a timing chart showing another example of the timing of supplying a write control signal and the timing of supplying a light-emitting control signal. FIG. 8B is a timing chart corresponding to the sub-pixel circuit 311 where the high definition display region 203 is present in the row direction of the plurality of sub-pixels circuit 311 in the non-high definition display region 204. In FIG. 8B, it is assumed that the same signals (Vsig) according to the image data are supplied to the sub-pixel circuit 311 at line k and the sub-pixel circuit 311 at line k+1. When the high definition display region 203 is present in the row direction, the sub-pixel circuit 311 is required to be selected one row at a time in order to perform display with high definition in the high definition display region 203. For this reason, in FIG. 8B, write control signals are supplied to the sub-pixel circuit 311 at line k and the sub-pixel circuit 311 at line k+1 at different timings. The same also applies to the light-emitting control signal.

Figure 9B:
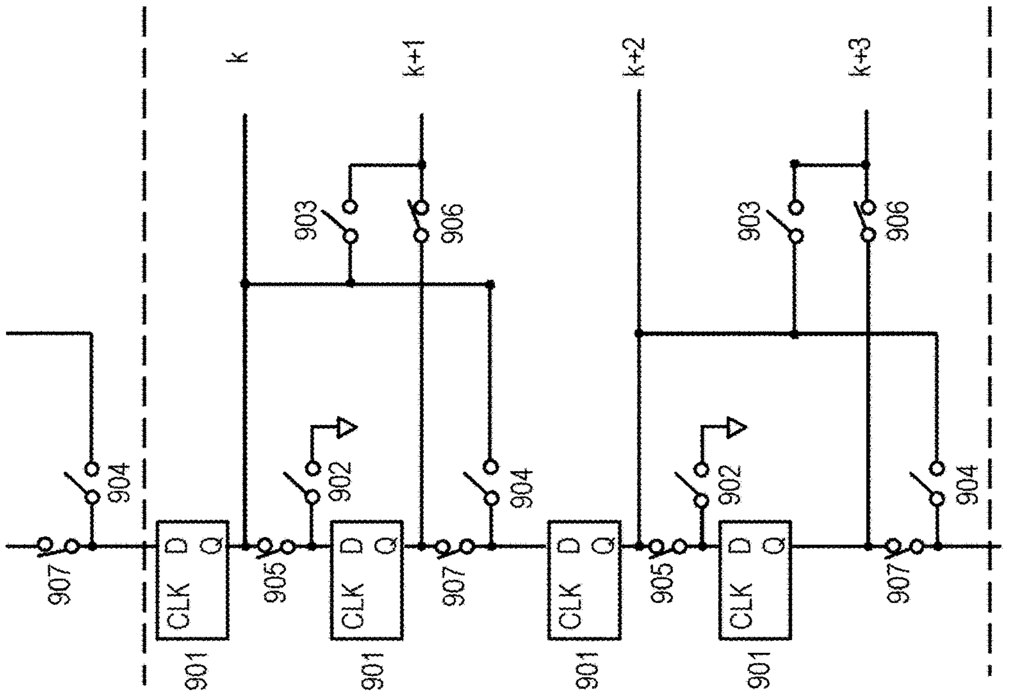
FIGS. 9A and 9B are each a circuit diagram showing one example of a configuration of a vertical scanning circuit.
Figure 9A:
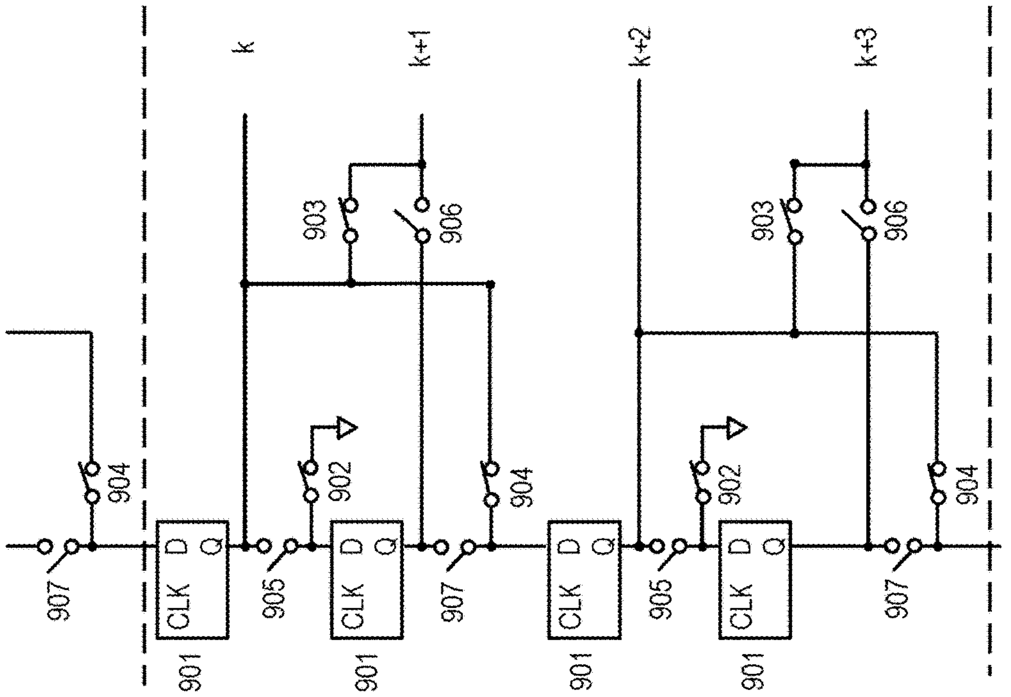

FIGS. 9A and 9B are each a circuit diagram showing one example of the configuration of the vertical scanning circuit 103. The vertical scanning circuit 103 has a shift register 901 between the write control lines 408 at respective lines so that the plurality of light-emitting elements 301 can be selected row by row. Further, the vertical scanning circuit 103 has a plurality of switch groups each including switches 902 to 907. As each of the switches 902 to 907, for example, an NMOS transistor can be used.

The control circuit 105 turns on (makes conducting) the switches 902 to 904, and turns off (makes non-conducting) the switches 905 to 907 as shown in FIG. 9A for the row where the high definition display region 203 is not present. In FIG. 9A, the write control line 408 at line k is connected with the write control line 408 at line k+1 not via the shift register 901. For this reason, write control signals can be supplied to the write control line 408 at line k and the write control line 408 at line k+1 at the same timing.

The control circuit 105 turns off (cuts) the switches 902 to 904, and turns on (connects) the switches 905 to 907 as shown in FIG. 9B for the row where the high definition display region 203 is present. In FIG. 9B, after supplying a write control signal to the write control line 408 at line k, a write control signal is supplied to the write control line 408 at line k+1 at a timing delayed by the shift register 901.

The control circuit 105 controls the switches 902 to 907 using, for example, a resolution control signal that is turned ON at the line where the high definition display region 203 is present, and is turned OFF at the line where the high definition display region 203 is not present. Incidentally, as described above, setting of the high definition display region 203 may be performed at the display apparatus 100 (the control circuit 105), or may be performed at an external device (e.g., an external device for generating image data to be displayed) of the display apparatus 100. The control circuit 105 may analyze the image data to be displayed, thereby to detect or determine the high definition display region, or may acquire information of the high definition display region from the metadata of the image data, or may determine the high definition display region according to the information of the line of sight of a user.

Figure 10:
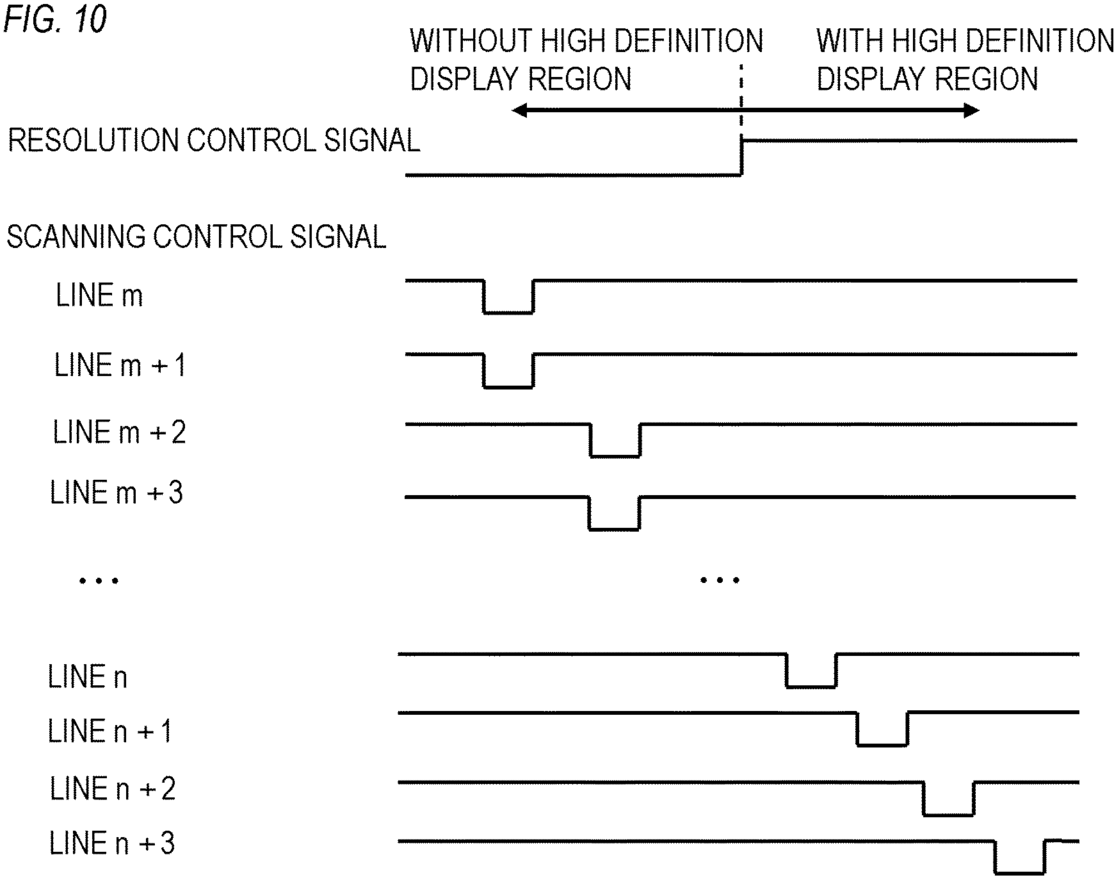
FIG. 10 is a timing chart showing one example of a resolution control signal and a scanning control signal.

FIG. 10 is a timing chart showing one example of the waveform of the resolution control signal and the waveform of the scanning control signal. As shown in FIG. 10, scanning control signals are sequentially supplied a plurality of lines at a time at lines where the high definition display region 203 is not present, and the scanning control signals are sequentially supplied one line by one line high at the lines where the high definition display region 203 is present.

Figure 11:
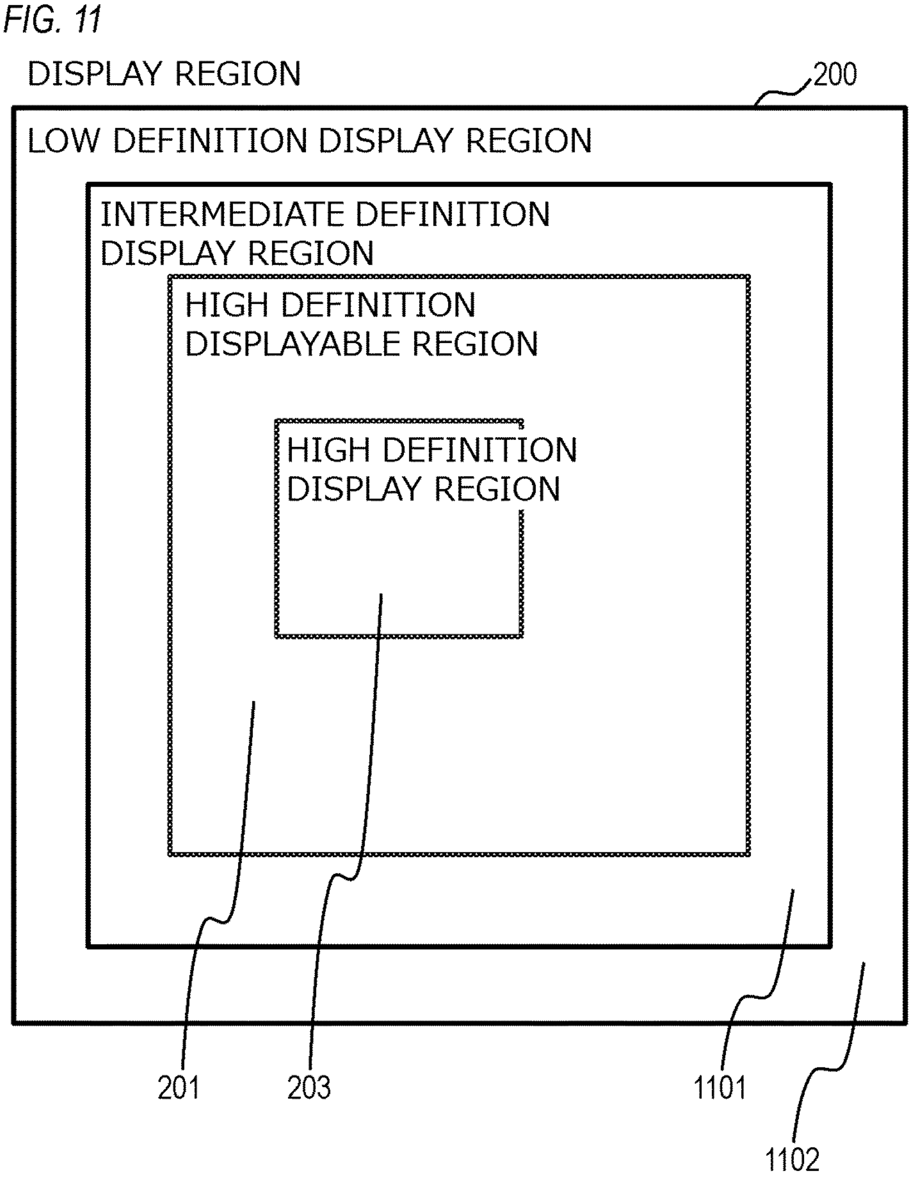
FIG. 11 is a schematic view showing a modified example of a display region.

Incidentally, as shown in FIG. 11, the low definition display region 202 may be divided into an intermediate definition display region 1101, and a low definition display region 1102 surrounding the intermediate definition display region 1101. The display resolution of the low definition display region 1102 is made lower than the display resolution of the intermediate definition display region 1101 by the circuit configuration of the pixels. For example, each sub-pixel in the high definition displayable region 201 has one light-emitting element 301, and each sub-pixel in the intermediate definition display region 1101 has a total of four light-emitting elements 301 of two in the horizontal direction×two in the vertical direction. Then, each sub-pixel in the low definition display region 1102 has a total of 16 light-emitting elements 301 of 4 in the horizontal direction×4 in the vertical direction.

Figure 12:
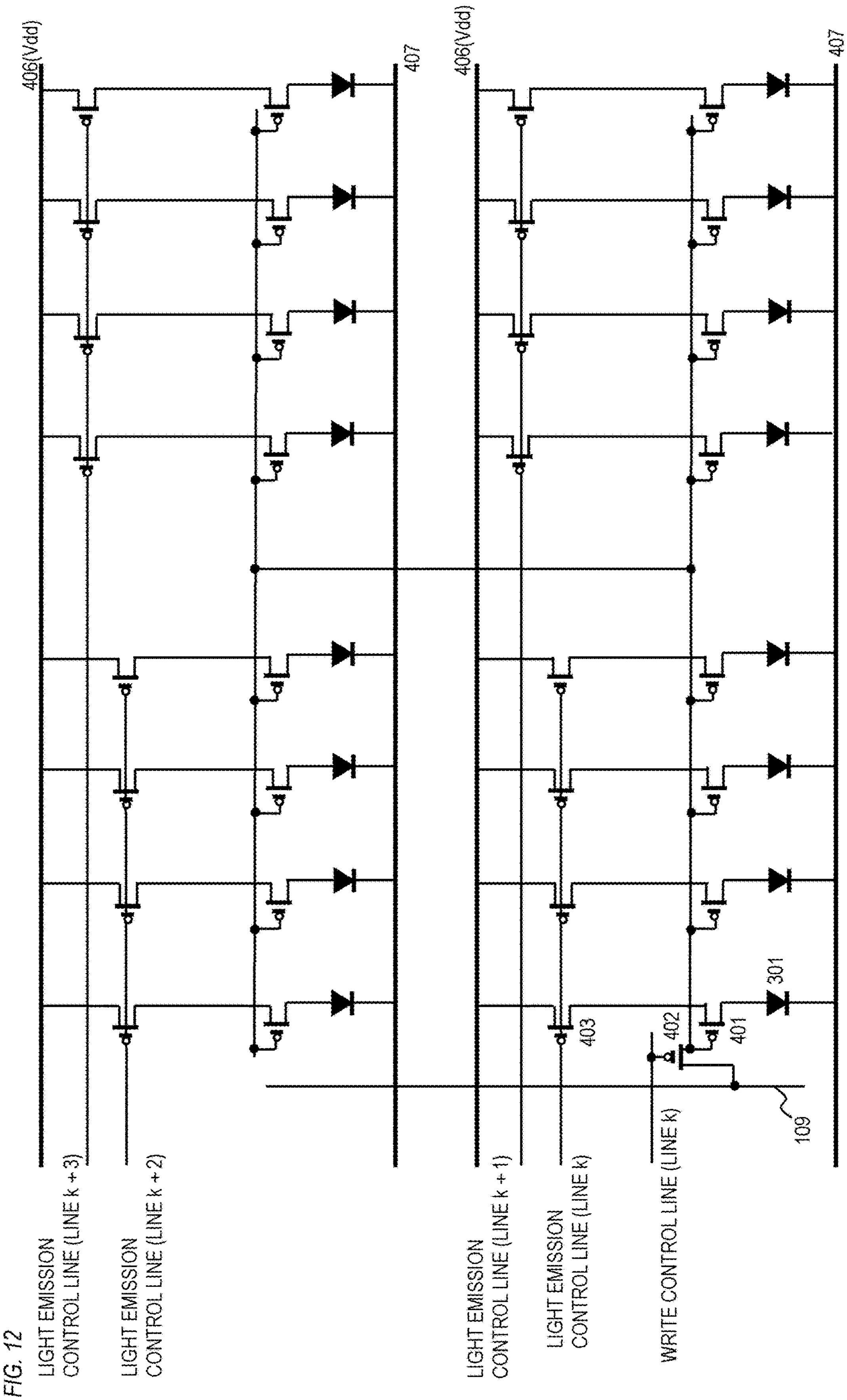
FIG. 12 is a circuit diagram showing one example of a configuration of a sub-pixel circuit in a low definition display region.

FIG. 12 is a circuit diagram showing one example of the configuration of the sub-pixel circuit in the low definition display region 1102. FIG. 12 is substantially the same as FIG. 6, except that the number of the light-emitting elements 301 is different from that of FIG. 6. In FIG. 12, one signal line 109 is connected with 16 light-emitting elements 301 (indirectly). In FIG. 12, as in FIG. 6, one writing transistor 402 is used. The signal line 109 is connected with the drain of the writing transistor 402, and the source of the writing transistor 402 is connected with 16 driving transistors 401 corresponding to the 16 light-emitting elements 301, respectively.

Figure 13:
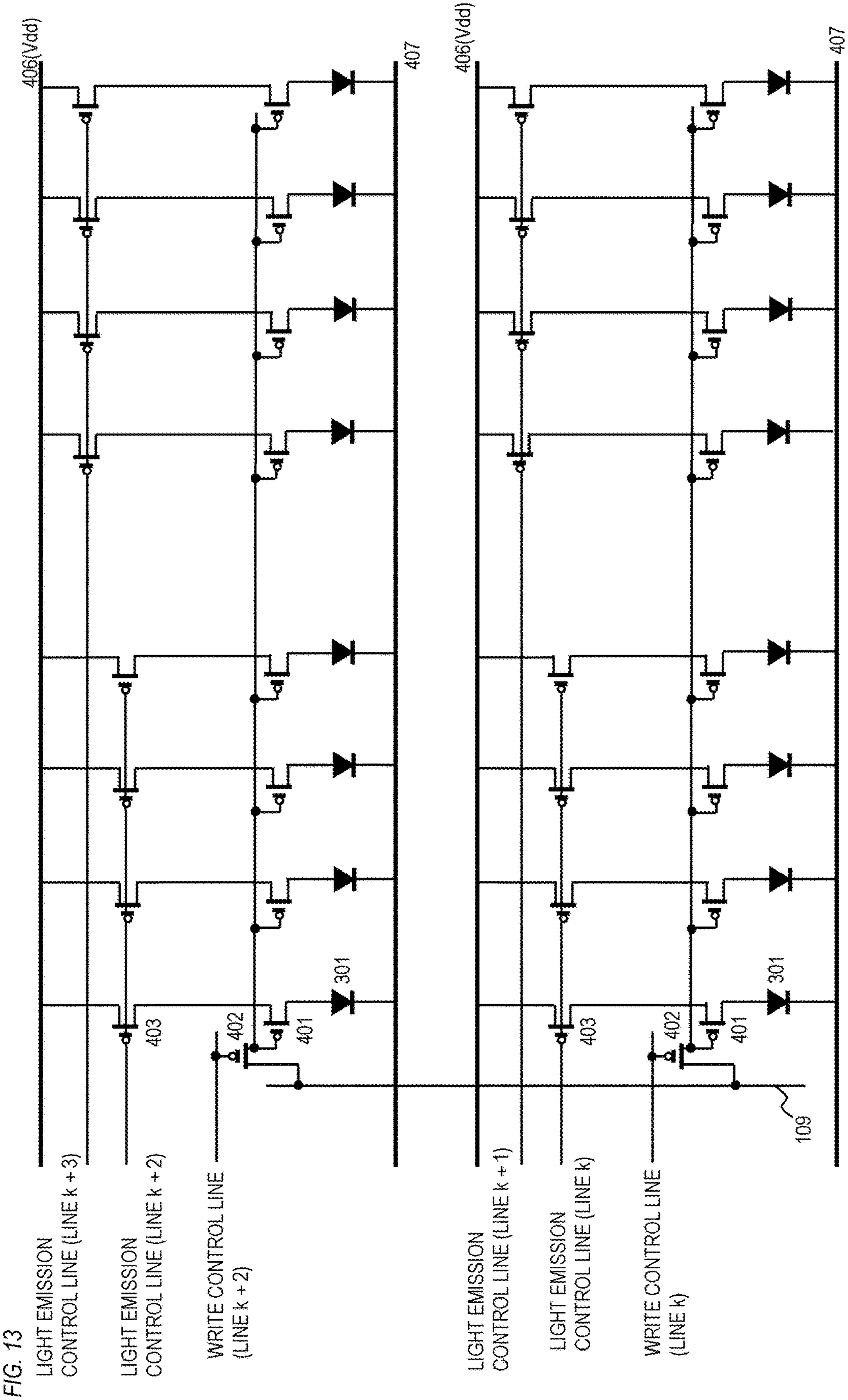
FIG. 13 is a circuit diagram showing a modified example of a configuration of a sub-pixel circuit in a low definition display region.

FIG. 13 is a circuit diagram showing a modified example of the configuration of the sub-pixel circuit in the low definition display region 1102. Also in FIG. 13, one signal line 109 is connected with 16 light-emitting elements 301 (indirectly). In FIG. 13, two writing transistors 402 are used. The signal line 109 is connected with respective drains of the two writing transistors 402. The source of one of the two writing transistors 402 is connected with 8 driving transistors 401 respectively corresponding to 8 light-emitting elements 301 at line k and line k+1. The source of the other of the two writing transistors 402 is connected with 8 driving transistors 401 respectively corresponding to 8 light-emitting elements 301 at line k+2 and line k+3.

Figure 14:
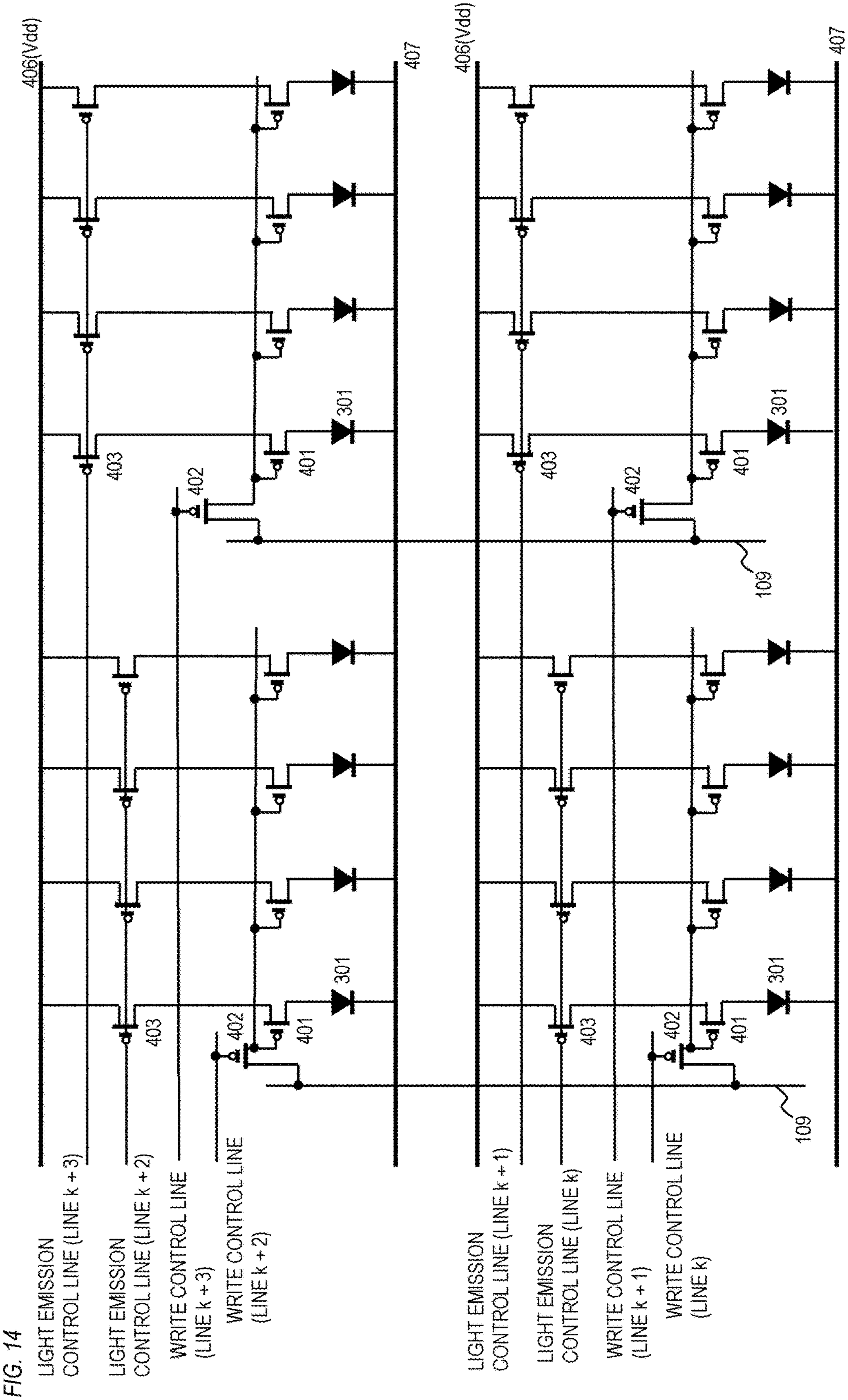
FIG. 14 is a circuit diagram showing a modified example of a configuration of a sub-pixel circuit in a low definition display region.

FIG. 14 is a circuit diagram showing a modified example of the configuration of the sub-pixel circuit in the low definition display region 1102. Also in FIG. 14, one signal line 109 is connected with 16 light-emitting elements 301 (indirectly). In FIG. 14, 4 writing transistors 402 are used. The signal line 109 is connected with respective drains of the 4 writing transistors 402. The source of the first writing transistor 402 of the 4 writing transistors 402 is connected with the 4 driving transistors 401 respectively corresponding to the 4 light-emitting elements 301 at line k. The source of the second writing transistor 402 is connected with 4 driving transistors 401 respectively corresponding to the 4 light-emitting elements 301 at line k+1. The source of the third writing transistor 402 is connected with 4 driving transistors

401 respectively corresponding to the 4 light-emitting elements 301 at line k+2. The source of the fourth writing transistor 402 is connected with 4 driving transistors 401 respectively corresponding to the 4 light-emitting elements 301 at line k+3.

Figure 15:
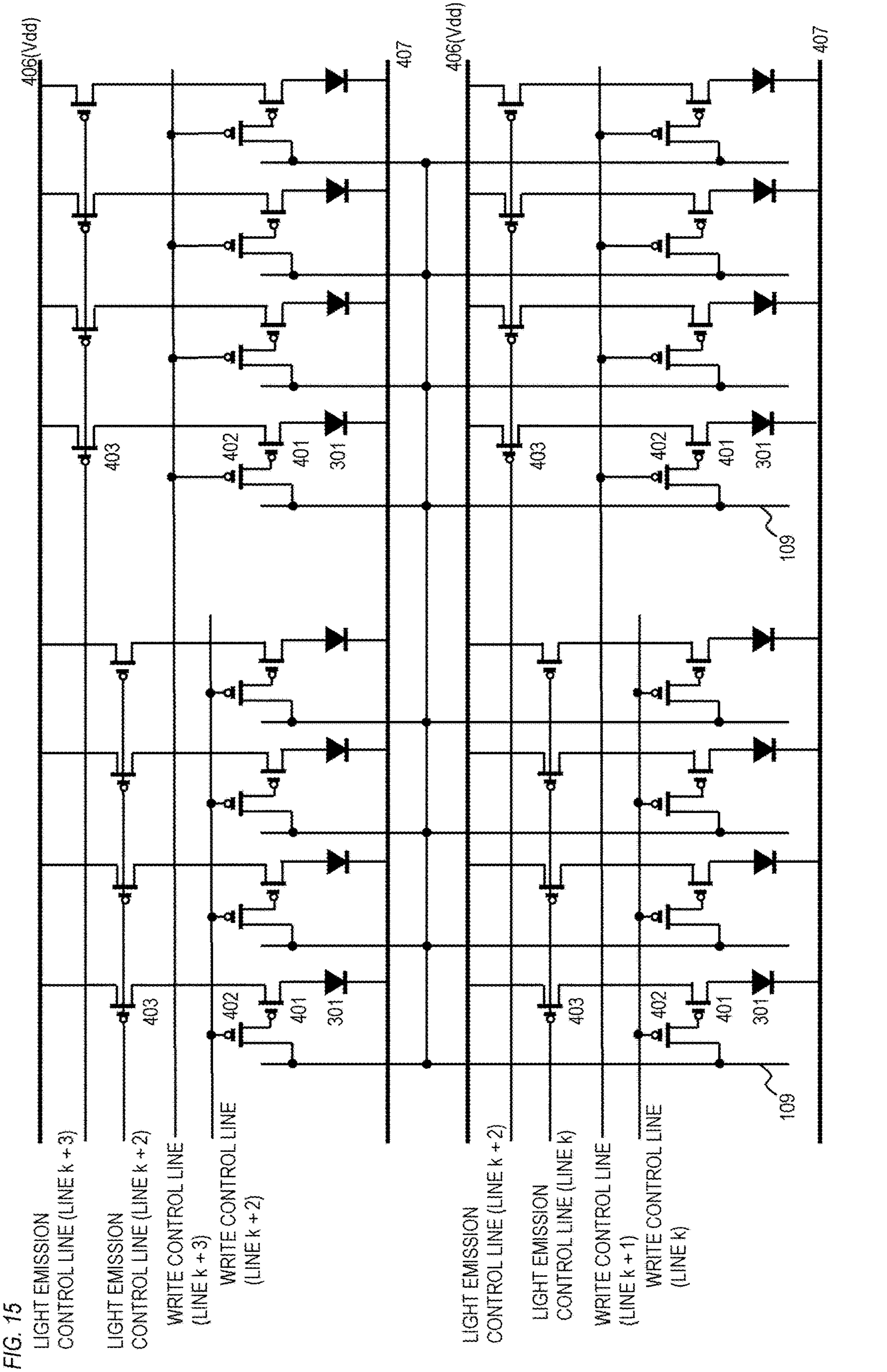
FIG. 15 is a circuit diagram showing a modified example of a configuration of a sub-pixel circuit in a low definition display region.

FIG. 15 is a circuit diagram showing a modified example of the configuration of the sub-pixel circuit in the low definition display region 1102. Also in FIG. 15, one signal line 109 is connected with 16 light-emitting elements 301 (indirectly). In FIG. 15, 16 writing transistors 402 respectively corresponding to the 16 light-emitting elements 301 are used. The signal line 109 is connected with respective drains of the 16 writing transistors 402.

Figure 16:
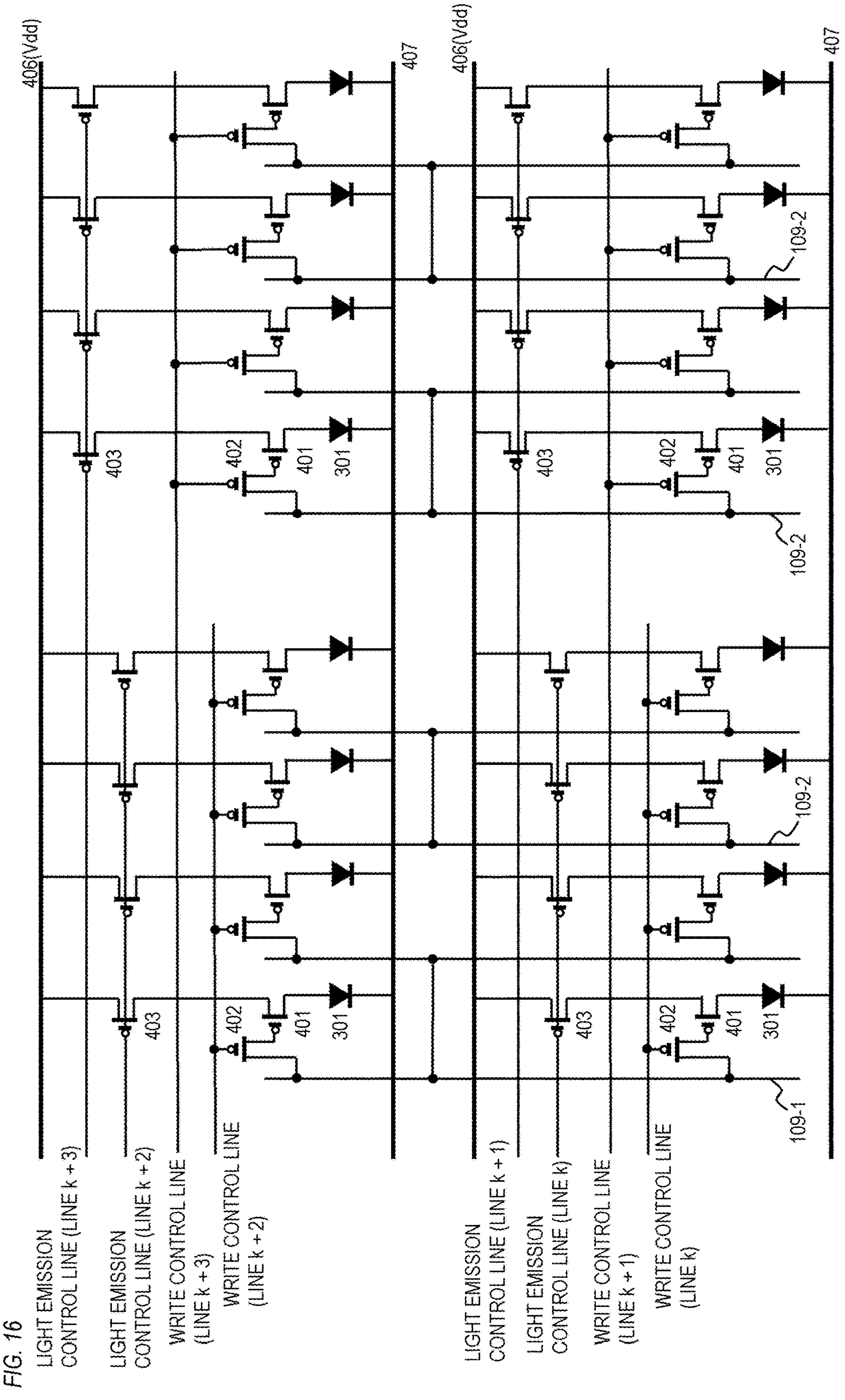
FIG. 16 is a circuit diagram showing a modified example of a configuration of a sub-pixel circuit in a low definition display region.

FIG. 16 is a circuit diagram showing a modified example of the configuration of the sub-pixel circuit in the low definition display region 1102. In FIG. 16, two signal lines 109-1 and 109-2 are used for 16 light-emitting elements. In FIG. 16, 16 writing transistors 402 respectively corresponding to 16 light-emitting elements 301 are used. The signal line 109-1 is connected with respective drains of 8 writing transistors 402 respectively corresponding to 8 light-emitting elements 301 at line j and line j+1. The signal line 109-2 is connected with respective drains of 8 writing transistors 402 respectively corresponding to 8 light-emitting elements 301 at line j+2 and line j+3.

In other embodiments in accordance with the present invention, a display apparatus having a plurality of pixels arranged in the row direction and in the column direction has a signal line of a first group, and a signal line of a second group with a larger interval than that of the signal line of the first group, and may have a control line of a first group, and a control line of a second group with a larger interval than that of the control line of the first group. The display apparatus has a display region, and includes a first region electrically connected with the signal line of the first group and the control line of the first group, and a second region connected with at least any of the signal line of the second group or the control line of the second group. The first region has a third region for receiving data with a high display resolution from the control portion (the control circuit) of the display apparatus, and a fourth region for receiving data with a lower display resolution than the display resolution of the third region. The third region can be set on the basis of external information, for example, information of detection of the line of sight of a user, and will not remain at a given position. A plurality of embodiments of the present specification can be combined unless they depart from the gist of the present invention.

Organic Light-Emitting Element

Next, a description will be given to one example of an organic light-emitting element usable for a display apparatus in accordance with Embodiment 1.

In the display apparatus in accordance with Embodiment 1, the organic light-emitting element has a first electrode, a second electrode, and an organic compound layer arranged between the electrodes. One of the first electrode and the second electrode is an anode, and the other thereof is a cathode. In Embodiment 1, the organic compound layer may be a monolayer, or may be a laminated body including a plurality of layers so long as it has a light-emitting layer. Herein, when the organic compound layer is a laminated body including a plurality of layers, the organic compound layer may have, other than the light-emitting layer, a hole injection layer, a hole transport layer, an electron blocking layer, a hole/exciton blocking layer, an electron transport layer, an electron injection layer, and the like. Further, the light-emitting layer may be a monolayer, or may be a laminated body including a plurality of layers. When the light-emitting layer includes a plurality of layers, a charge generation layer may be included between the light-emitting layers. The charge generation layer may include a compound with a lower LUMO than that of the hole transport layer. The LUMO of the charge generation layer may be lower than the hole transport layer HOMO. Herein, the molecular orbital energy of the organic compound layer may be the molecular orbital energy of the organic compound with the largest weight ratio of the organic compound layer.

In Embodiment 1, when the organic compound is included in the light-emitting layer, the light-emitting layer may be the layer including only an organic compound, or may be the layer including an organic metal complex and other compounds. Herein, when the light-emitting layer includes an organic metal complex and other compounds, the organic compound may be used as the host of the light-emitting layer, or may be used as the guest. Alternatively, the organic compound layer may be used as an assist material that can be included in the light-emitting layer. Herein, the host is the compound with the largest mass ratio of the compounds configuring the light-emitting layer. Further, the guest is the compound with a smaller mass ratio than that of the host among the compounds configuring the light-emitting layer, and is the compound bearing the responsibility of main light emission. Further, the assist material is the compound with a smaller mass ratio than that of the host among the compounds configuring the light-emitting layer, and assisting the light emission of the guest. Incidentally, the assist material is also referred to as a second host. The host material can also be referred to as a first compound, and the assist material can also be referred to as a second compound.

Herein, the organic compound can be used, if required, together with conventionally known low-molecular type and high-molecular type hole injectable compounds or hole transportable compound, a compound to be a host, a light-emitting compound, an electron injectable compound or an electron transportable compound, or the like.

As the hole injectable transportable materials, materials with a high hole mobility is preferable so as to facilitate the injection of holes from the anode, and so as to enable transport of the injected holes to the light-emitting layer. Further, in order to reduce the deterioration of the film quality such as crystallization in the organic light-emitting element, a material with a high glass transition point temperature is preferable.

The electron transportable material can be selected arbitrarily from those capable of transporting the electrons injected from the cathode to the light-emitting layer, and is selected in consideration of the balance with the hole mobility of the hole transportable material, or the like. The electron transportable material is also preferably used for a hole blocking layer.

The electron injectable material can be selected arbitrarily from those capable of easy electron injection from the cathode, and is selected in consideration of the balance with the hole injectability, or the like. The material can also be used in combination with the electron transport material.

Configuration of Organic Light-Emitting Element

The organic light-emitting element is provided by forming an insulation layer, a first electrode, an organic compound layer (which may be referred to as a functional layer), and a second electrode on the substrate. On the cathode, a protective layer, a color filter, a microlens, or the like may be provided. When the color filter is provided, a planarization layer may be provided between it and the protective layer. The planarization layer can be composed of an acrylic resin, or the like. The same also applies to the case where the planarization layer is provided between the color filter and the microlens.

Substrate

As the substrate, mention may be made of quartz, glass, a silicon wafer, a resin, a metal, or the like. Further, on the substrate, a switching element such as a transistor, or a wire is included. Thereon, an insulation layer (which may be referred to as an insulation film) may be included. When a silicon wafer is used as the substrate, the active layer, the source region, and the drain region of the transistor are formed in the substrate. Further, transistors can be arranged densely, which is preferable.

As the insulation layer, any material is acceptable so long as a contact hole can be formed, and insulation from a wire not to be connected can be ensured so as to enable the formation of wiring between the insulation layer and the first electrode. For example, a resin such as polyimide, silicon oxide, or silicon nitride can be used.

Electrode

As the electrodes, a pair of electrodes can be used. The pair of electrodes may be an anode (which may be referred to as an anode electrode) and a cathode (which may be referred to as a cathode electrode). When an electric field is applied in the direction of the light emission of the organic light-emitting element, the electrode with a higher potential is the anode, and the other is the cathode. Further, it can also be said that the electrode for supplying holes to the light-emitting layer is the anode, and that the electrode for supplying electrons thereto is the cathode.

The work function is desirably as large as possible as the constituent material for the anode. For example, a metal simple substance such as gold, platinum, silver, copper, nickel, palladium, cobalt, selenium, vanadium, or tungsten can be used. Alternatively, a mixture including these, or an alloy of combination thereof, or a metal oxide such as tin oxide, zinc oxide, indium oxide, indium tin oxide (ITO), or indium zinc oxide can be used. Still alternatively, a conductive polymer such as polyaniline, polypyrrole, or polythiophene can also be used.

The electrode substances may be used singly alone, or may be used in combination of two or more thereof. Further, the anode may include one layer, or may include a plurality of layers.

When the electrode is used as a reflection electrode, for example, chromium, aluminum, silver, titanium, tungsten, or molybdenum, or an alloy thereof, or a lamination thereof can be used. The materials can also function as a reflection film not having a role as an electrode. Alternatively, when the electrode is used as a transparent electrode, an oxide transparent conductive layer of indium tin oxide (ITO), indium zinc oxide, or the like, or other ones can be used. However, the present invention is not limited thereto. For the formation of the electrode, the photolithography technology can be used.

On the other hand, as the constituent material of the cathode, the one with a small work function is desirable. Examples thereof may include an alkali metal such as lithium, an alkaline-earth metal such as calcium, or a metal simple substance such as aluminum, titanium, manganese, silver, lead, or chromium, or a mixture including these. Alternatively, an alloy of combination of the metal simple substances can be used. For example, magnesium-silver, aluminum-lithium, aluminum-magnesium, silver-copper, or zinc-silver can be used. A metal oxide such as tin oxide indium (ITO) can also be used.

The electrode substances may be used singly alone, or may be used in combination of two or more thereof. Further, the cathode may have a monolayered configuration, or may have a multilayered configuration. Out of these, silver is preferably used. Use of a silver alloy is further preferable in order to reduce the agglomeration of silver. Any ratio of the alloy is acceptable so long as the agglomeration of silver can be reduced. For example, silver: other metals may be 1:1, 3:1, or the like.

The cathode may be set as a top emission element using an oxide conductive layer of ITO or the like, or may be set as a bottom emission element using a reflection electrode of aluminum (Al) or the like, and has no particular restriction. The method for forming the cathode has no particular restriction. Use of a direct-current and alternating-current sputtering method, or the like results in good coverage of the film, and facilitates the reduction of the resistance, and hence is preferable.

Pixel Isolation Layer

The pixel isolation layer is formed of a silicon nitride (SiN) film, a silicon oxynitride (SiON) film, or a silicon oxide (SiO) film formed using the chemical gas phase deposition method (the CVD method). In order to increase the resistance in the in-plane direction of the organic compound layer, the organic compound layer, particularly the hole transport layer is preferably deposited with a thin film thickness at the sidewall of the pixel isolation layer. Specifically, by increasing the taper angle of the sidewall of the pixel isolation layer, or the film thickness of the pixel isolation layer, and increasing the vignetting upon vacuum evaporation, deposition can be achieved with a thin film thickness of the sidewall.

On the other hand, for the pixel isolation layer, the sidewall taper angle of the pixel isolation layer or the film thickness of the pixel isolation layer is preferably adjusted enough to prevent the formation of a gap in the protective layer to be formed thereon. A gap is not formed in the protective layer. For this reason, it is possible to reduce the occurrence of defects in the protective layer. The occurrence of defects in the protective layer is reduced. For this reason, it is possible to reduce the reliability reduction such as the occurrence of a dark spot or the generation of poor conduction of the second electrode.

By adjusting the taper angle of the sidewall of the pixel isolation layer, it becomes possible to effectively suppress the electric charge leakage to the adjacent pixel. For example, a taper angle falling within at least 60 degrees and not more than 90 degrees can achieve sufficient reduction. The film thickness of the pixel isolation layer is desirably at least 10 nm and not more than 150 nm. Further, the same effect can be obtained even when only a pixel electrode not having a pixel isolation layer achieves the configuration. However, in this case, preferably, the film thickness of the pixel electrode is set equal to, or smaller than that of the organic layer, or the pixel electrode end is formed in a forward tapered shape of less than 60°, because the short-circuit of the organic light-emitting element can be reduced.

Organic Compound Layer (Functional Layer)

The organic compound layer may be formed of a monolayer, or may be formed of a plurality of layers. When the organic compound layer has a plurality of layers, it may be referred to as a hole injection layer, a hole transport layer, an electron blocking layer, a light-emitting layer, a hole blocking layer, an electron transport layer, or an electron injection layer according to the function thereof. The organic compound layer mainly includes an organic compound, and may include an inorganic atom, or an inorganic compound. For example, the organic compound layer may have copper, lithium, magnesium, aluminum, iridium, platinum, molybdenum, zinc, or the like. The organic compound layer may be arranged between the first electrode and the second electrode, and may be arranged in contact with the first electrode and the second electrode.

When the organic compound layer has a plurality of light-emitting layers, it may have an electric charge generation portion between the first light-emitting layer and the second light-emitting layer. The electric charge generation portion may have an organic compound with a Lowest Unoccupied Molecular Orbital Energy (LUMO) of −5.0 eV or less. The same also applies to the case where the organic compound layer has the electric charge generation portion between the second light-emitting layer and the third light-emitting layer.

Protective Layer

A protective layer such as an insulation film may be provided on the second electrode. For example, by bonding glass provided with a moisture absorbent onto the second electrode, it is possible to reduce the permeation of water or the like to the organic compound layer, which can reduce the occurrence of poor display. Alternatively, as another embodiment, it is also acceptable that a passivation film of silicon nitride or the like is provided on the cathode, thereby reducing the permeation of water or the like to the organic compound layer. For example, the following is also acceptable: after the formation of the cathode, the resulting cathode is transported to another chamber without breaking the vacuum; and a silicon nitride film with a thickness of 2 μm is formed with the CVD method, resulting in a protective layer. After the deposition with the CVD method, a protective layer using the atom layer deposition method (the ALD method) may be provided. Although the material for the film with the ALD method has no restriction, it may be silicon nitride, silicon oxide, aluminum oxide, or the like. On the film formed with the ALD method, further, silicon nitride may be formed with the CVD method. The film by the ALD method may have a smaller film thickness than that of the film formed with the CVD method. Specifically, the film thickness may be 50% or less, and further 10% or less.

Color Filter

On the protective layer, a color filter may be provided. For example, the following is also acceptable: a color filter in consideration of the size of the organic light-emitting element is provided on another substrate, which is bonded with a substrate provided with an organic light-emitting element; or a color filter is patterned on the protective layer shown above using the photolithography technology. The color filter may include a polymer.

Planarization Layer

A planarization layer may be included between the color filter and the protective layer. The planarization layer is provided for the purpose of reducing the unevenness of the underlying layer. The planarization layer may be referred to as a material resin layer without restricting the object. The planarization layer may include an organic compound, and may be a low-molecular-weight compound or a polymer, and is preferably a polymer.

The planarization layers may be provided on and under the color filter, and the constituent materials thereof may be the same or different. Specifically, mention may be made of a polyvinyl carbazole resin, a polycarbonate resin, a polyester resin, an ABS resin, an acrylic resin, a polyimide resin, a phenol resin, an epoxy resin, a silicon resin, a urea resin, or the like.

Microlens

The display apparatus may have an optical member such as a microlens on the light-emitting side thereof. The microlens can include an acrylic resin, an epoxy resin, or the like. The microlens may aim at increasing the amount of light to be extracted from the display apparatus, and controlling the direction of light to be extracted. The microlens may have a hemispherical shape. When the microlens has a hemispherical shape, the tangents in contact with the hemisphere include a tangent in parallel with the insulation layer. The point of contact between the tangent and the hemisphere is the vertex of the microlens. The vertex of the microlens can also be determined similarly in a given cross section. In other words, the tangents in contact with the hemisphere of the microlens in cross section include a tangent in parallel with the insulation layer, and the point of contact between the tangent and the hemisphere is the vertex of the microlens.

Further, the middle point of the microlens can also be defined. In the cross section of the microlens, the line segment between the point of completion of the shape of a circular arc and the point of completion of the shape of another circular arc is assumed. The middle point of the line segment can be referred to as the middle point of the microlens. The cross section for distinguishing between the vertex and the middle point may be the cross section perpendicular to the insulation layer.

The microlens has a first surface having a protruded portion, and a second surface opposite to the first surface. The second surface is preferably arranged closer to the functional layer side than the first surface. In order to achieve such a configuration, a microlens is required to be formed on the display apparatus. When the functional layer is an organic layer, the process causing high temperatures in the manufacturing step is preferably avoided. Further, when the configuration in which the second surface is arranged closer to the functional layer side than the first surface is assumed, all the glass transition temperatures of the organic compounds configuring the organic layer are preferably 100° C. or more, and more preferably 130° C. or more.

Opposing Substrate

On the planarization layer, an opposing substrate may be included. The opposing substrate is provided at the position opposed to the foregoing substrate, and hence is referred to as an opposing substrate. The constituent materials for the opposing substrate may be the same as those for the foregoing substrate. The opposing substrate may be the second substrate when the foregoing substrate is assumed to be the first substrate.

Organic Layer

The organic compound layer (such as the hole injection layer, the hole transport layer, the electron block layer, the light-emitting layer, the hole block layer, the electron transport layer, or the electron injection layer) configuring the organic light-emitting element is formed in the following manner.

The organic compound layer configuring the organic light-emitting element can use a dry process such as the vacuum evaporation method, the ionization vacuum evaporation method, sputtering, or plasma. Alternatively, in place of the dry process, a wet process in which a layer is formed by dissolution in an appropriate solvent with the known method (e.g., spin coating, dipping, the cast method, the LB method, or the ink jet method) can be used.

Herein, when a layer is formed by the vacuum evaporation method, the solution coating method, or the like, crystallization or the like is less likely to be caused, resulting in excellent temporal stability. Alternatively, when deposition is achieved by the coating method, a layer can be formed by combination with an appropriate binder resin.

As the binder resin, mention may be made of a polyvinyl carbazole resin, a polycarbonate resin, a polyester resin, an ABS resin, an acrylic resin, a polyimide resin, a phenol resin, an epoxy resin, a silicon resin, a urea resin, or the like. However, the present invention is not limited thereto.

Further, the binder resins may be used singly alone, or may be used in mixture of two or more thereof as a homopolymer or a copolymer. Further, if required, additives such as a known plasticizer, antioxidant, and UV absorber may be used in combination.

Pixel Circuit

The display apparatus has a pixel circuit connected with the light-emitting element. The pixel circuit may be of an active matrix type of each independently controlling the light emission of the first light-emitting element and the second light-emitting element. The active matrix type circuit may be voltage programming, or may be current programming. The display apparatus has a pixel circuit for each pixel. The pixel circuit may have a light-emitting element, a transistor for controlling the light emission brightness of the light-emitting element, a transistor for controlling the light-emission timing, a capacity for holding the gate voltage of the transistor for controlling the light emission brightness, and a transistor for establishing a connection to GND not via a light-emitting element.

The display apparatus has a display region and a peripheral region arranged around the display region. A pixel circuit is included in the display region, and a display control circuit is included in the peripheral region. The mobility of the transistor configuring the pixel circuit may be smaller than the mobility of the transistor configuring the display control circuit.

The slope of the current voltage characteristic of the transistor configuring the pixel circuit may be smaller than the slope of the current voltage characteristic of the transistor configuring the display control circuit. The slope of the current voltage characteristic can be measured by the so-called Vg-Ig characteristic.

The transistor configuring the pixel circuit is the transistor connected with the light-emitting element such as the first light-emitting element.

Pixel

The display apparatus has a plurality of pixels. The pixel has sub-pixels for emitting colors different from each other and from others. The sub-pixel may have, for example, respective RGB luminescent colors.

In the pixel, the region also referred to as a pixel opening emits a light. The region is the same as the first region. The pixel opening may have a size of 15 μm or less and may have a size of 5 μm or more. More specifically, 11 μm, 9.5 μm, 7.4 μm, 6.4 μm, or the like is acceptable. The distance between the sub-pixels (from the center to the center of the adjacent sub-pixels) may be 10 μm or less. Specifically, 8 μm, 7.4 μm, or 6.4 μm or less is acceptable.

The pixels can assume a known arrangement form in a plan view. For example, a stripe arrangement, a delta arrangement (a honeycomb arrangement), a PenTile arrangement, or a Bayer arrangement is acceptable. The shape in a plan view of the sub-pixel may assume any known shape. Examples thereof may include a quadrangular shape such as a rectangle or a rhomb, and a hexagon. As a matter of course, the shape is included in a rectangle so long as it is not a precise figure, but is a shape close to a rectangle. The shape of the sub-pixel and the pixel array can be used in combination.

Use of Display Apparatus in Accordance With Embodiment 1

A display apparatus in accordance with Embodiment 1 can be used as a constituent member of various equipment, devices, or the like. For example, there is the use as a display apparatus having a color filter for a white light source.

The device having the display apparatus in accordance with Embodiment 1 may be an image information processing apparatus having an image input portion for inputting image information from an area CCD, a linear CCD, a memory card, or the like, and having an information processing portion for processing the inputted information, and for displaying the inputted image at a display portion. The display portion can have the display apparatus in accordance with Embodiment 1.

Further, the display portion possessed by an image pickup device or an ink jet printer may have the display apparatus in accordance with Embodiment 1. The display portion may have a touch-panel function. The driving system of the touch-panel function may be an infrared radiation system, an electrostatic capacity system, a resistance film system, or an electromagnetic induction system, and has no particular restriction. Further, the display apparatus may be used for the display portion of a multifunction printer.

Figure 17:
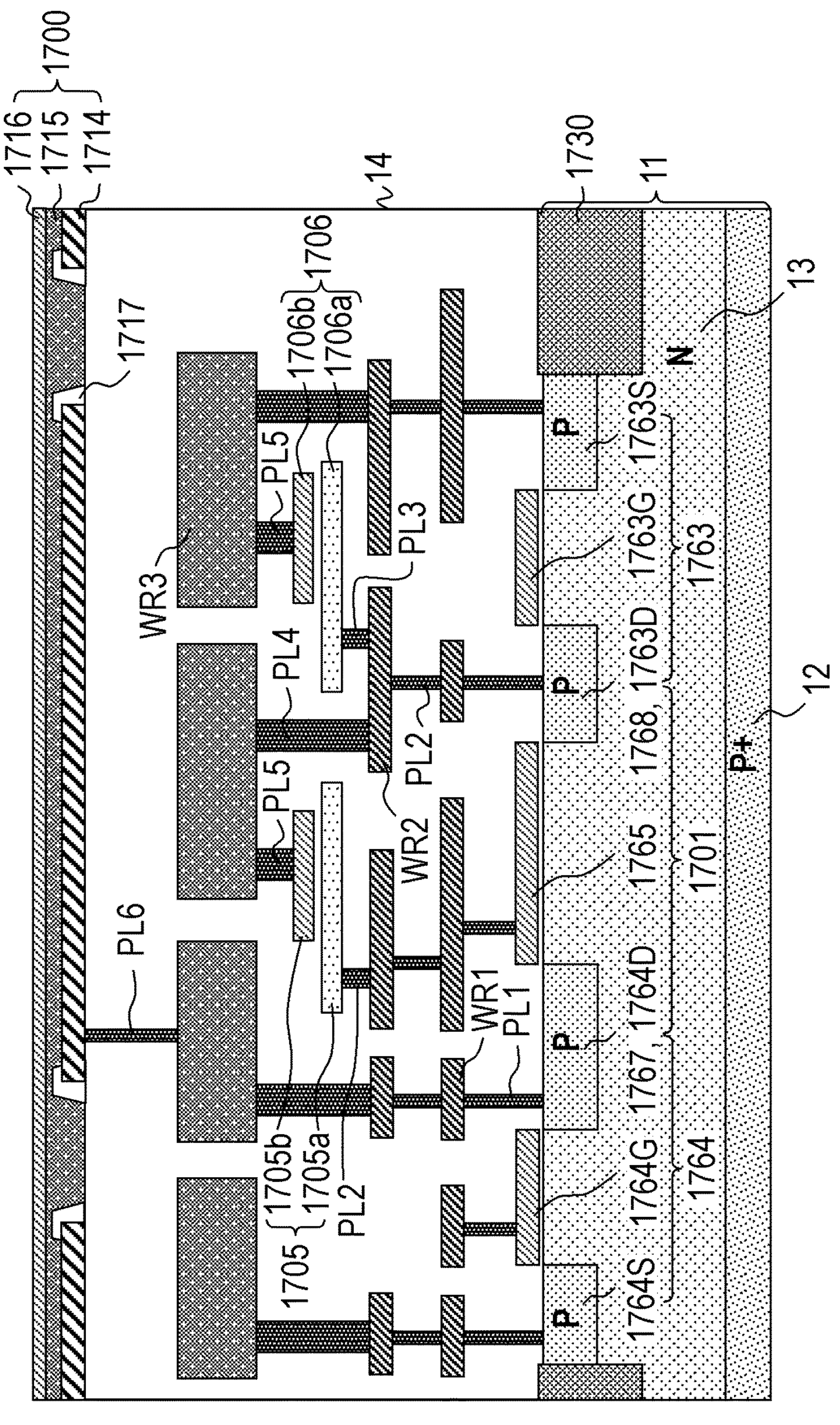
FIG. 17 is a schematic view showing one example of a cross section of a part of a display apparatus.

Then, the cross section of one example of a part of the display apparatus of Embodiment 1 will be described by reference to FIG. 17. Incidentally, the foregoing already described elements, and the like may be given different reference signs and numerals for convenience of description.

The display apparatus includes a substrate 11, an insulation layer 14, and a light-emitting element 1700. The insulation layer 14 is situated on the substrate 11. The light-emitting element 1700 is situated on the insulation layer 14. In other words, the insulation layer 14 is situated between the substrate 11 and the light-emitting element 1700.

The substrate 11 has a main surface (in FIG. 17, the upper surface) including a driving transistor 1701, a reset transistor 1764, and a light-emitting control transistor 1763 formed thereon. The substrate 11 may be formed of, for example, a P type semiconductor. On the main surface side (i.e., the upper side of the substrate 11) of the substrate 11, an N type well region 13 is formed. Other region than the well region 13 of the substrate 11 becomes a P type semiconductor region 12.

The substrate 11 has a plurality of impurity regions functioning as the source region or the drain region of the transistor in the well region 13. The conductivity type of the impurity region can be set, for example, as a P type for all the regions.

On the main surface (the upper surface) of the substrate 11, a conductive layer 1765, a conductive layer 1763G, and a conductive layer 1764G are arranged. The conductive layer 1763G functions as the gate of the light-emitting control transistor 1763. One of the P type impurity regions functions as the source 1763S of the light-emitting control transistor 1763, and another of the P type impurity regions functions as a drain 1763D. The conductive layer 1765 functions as the gate of the driving transistor 1761. The impurity region functioning as the drain 1763D of the light-emitting control transistor 1763 also functions as the source 1768 of the driving transistor 1701. Further, one of another P type impurity region functions as the drain 1767 of the driving transistor 1701.

Further, the conductive layer 1764G functions as the gate of the reset transistor 1764. Further, the impurity region functioning as the source 1768 of the driving transistor 1701 also functions as the drain 1764D of the reset transistor 1764. Further, one of another P type impurity region functions as the source 1764S of the reset transistor 1764.

The substrate 11 further has an element isolation portion 1730 formed between the adjacent pixels. As the element isolation portion 1730, STI (Shallow Trench Isolation), LOCOS (Local Oxidation of Silicon) isolation, N type diffusion layer isolation, or the like may be used.

The light-emitting element has a cathode 1716, an organic light-emitting layer 1715, and an anode 1714. The cathode 1716 is electrically connected with a power supply line (not shown). The anode 1714 is electrically connected with the main terminal (herein, the drain) of the driving transistor 1701. The organic light-emitting layer 1715 is situated between the cathode 1716 and the anode 1714. At the end of the anode 1714, a bank portion 1717 is arranged. The bank portion 1717 suppresses leakage of the current flowing between the anode 1714 and the cathode 1716 to the adjacent pixel.

In the insulation layer 14, a conductive pattern, the electrode of the capacitance element, and a plug are buried. The insulation layer 14 may be, for example, silicon oxide. Each of the conductive patterns may be a wiring layer. For example, as shown in FIG. 17, the conductive pattern may have a wire WR1, a wire WR2, and a wire WR3.

The capacitance element 1705 has an electrode 1705*a* and an electrode 1705*b*, and the capacitance element 1706 has an electrode 1706*a* and an electrode 1706*b*. In the insulation layer 14, the electrode 1705*a* and the electrode 1706*a* may be arranged on the same insulation layer. Further, the electrode 1705*b* and the electrode 1706*b* may be arranged on the same insulation layer. The electrode 1705*a* and the electrode 1705*b* are opposed to each other across the insulation layer. Further, the electrode 1706*a* and the electrode 1706*b* are opposed to each other across the insulation layer. As a result of this, a capacitance element of a MIM (Metal-Insulator-Metal) structure is configured.

A plurality of plugs may have, for example, a plug PL1, a plug PL2, a plug PL3, a plug PL4, and a plug PL5. All of the plurality of plugs may have the same thickness, or may have different thicknesses, or may partially have the same thickness, or may partially have different thicknesses.

The plug PL1 may connect the wire WR1 and the terminal (any of the gate, the source, and the drain) of a transistor. The plug PL2 may connect the wire WR1 and the wire WR2. The lower electrode of the capacitance element (1705 or 1706) may be connected with the driving transistor 1701 via the plug PL3, the wire WR2, the plug PL2, the wire WR1, and the plug PL1. Further, the upper electrode of the capacitance element (1705 or 1706) may be connected with the wire WR3 via the plug PL5.

The wire WR3 may be connected with a transistor (in FIG. 17, any of the driving transistor, the current control transistor, and the reset transistor) via the plug PL4, the wire WR2, the plug PL2, the wire WR1, and the plug PL1. The anode 1714 may be connected with the drain 1767 of the driving transistor 1701 via the plug PL6, the wire WR3, the plug PL4, the wire WR2, the plug PL2, the wire WR1, and the plug PL1.

The plug may be manufactured in a different step from that of the wire, and may be formed at the same step as that of the wire to be arranged on the plug. For example, the wire WR2 and the plug PL2 may be formed at the same step, and may have the same materials. Further, the wire WR3 and the plug PL4 may be formed at the same step, and may have the same materials. The wire and the plug can be formed using a metal simple substance such as copper, tungsten, aluminum, or titanium.

Thus, by suing a semiconductor substrate for the substrate, and setting the transistor possessed by each pixel as a MOS transistor, it is possible to achieve a further dense arrangement as compared with the case where a thin film transistor is used as the transistor. Accordingly, by assuming the configuration in which the display apparatus of Embodiment 1 has a semiconductor substrate, and the transistor is a MOS transistor, it is possible to achieve a higher definition or a smaller size of the display apparatus.

Figure 18:
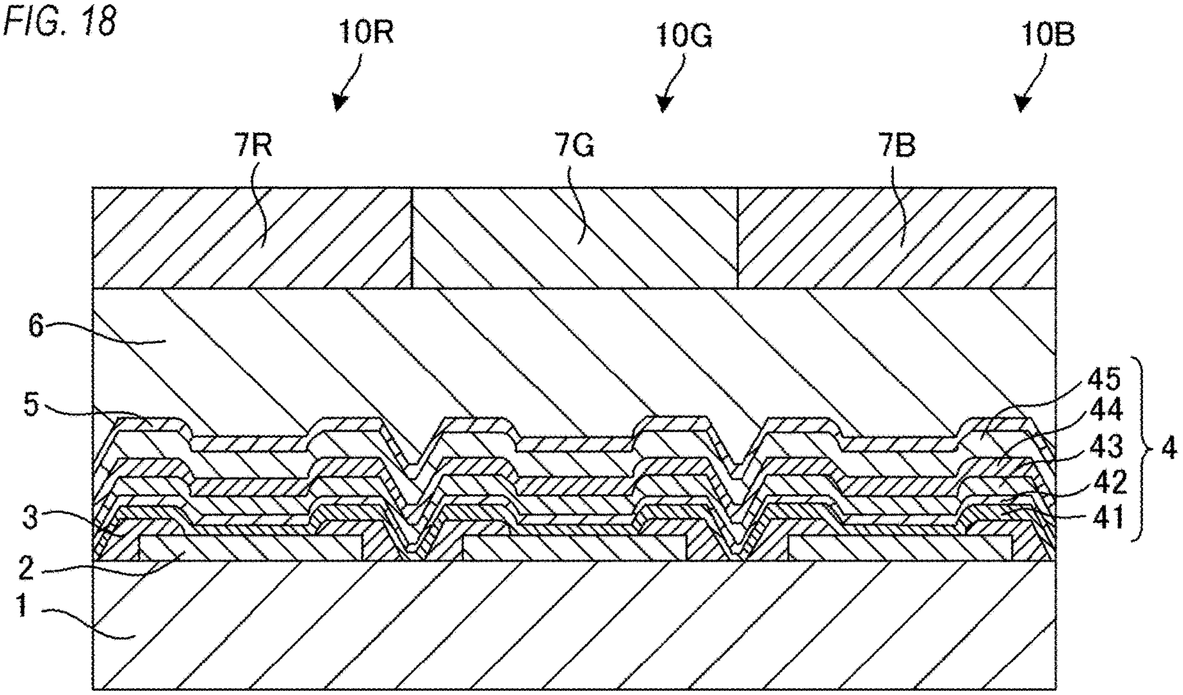
FIG. 18 is a schematic view showing one example of a cross section of a pixel.

FIG. 18 is a cross sectional schematic view showing the example of a display apparatus having an organic light-emitting element and a transistor to be connected with the organic light-emitting element. The transistor is one example of an active element. Herein, the example in which the transistor is a thin film transistor (TFT) is shown. However, a MOSFET using a semiconductor substrate can be used. By using a MOSFET, it is possible to arrange transistors in respective pixels in a smaller area.

FIG. 18 is one example of the pixel that is a constituent element of the display apparatus in accordance with Embodiment 1. The pixel has a sub-pixel 10. The sub-pixel is divided into 10R, 10G, and 10B according to the light to be emitted thereof. The luminescent color may be distinguished by the wavelength emitted from the light-emitting layer, or the light emitted from the sub-pixel may be selectively transmitted or color-converted by a color filter, or the like. Each sub-pixel has a reflection electrode 2 that is the first electrode on the interlayer insulation layer 1, an insulation layer 3 covering the end of the reflection electrode 2, an organic compound layer 4 covering the second electrode and the insulation layer, a second electrode 5, a protective layer 6, and a color filter 7.

The interlayer insulation layer 1 may include a transistor and a capacitance element at the underlying layer or the inside thereof. The transistor and the first electrode may be electrically connected with each other via a contact hole not shown, or the like.

The insulation layer 3 is also referred to as the bank, or the pixel isolation film. The insulation layer 3 covers the end of the first electrode, and is arranged surrounding the first electrode. The portion in which the insulation layer is not arranged comes in contact with the organic compound layer 4, to be a light-emitting region.

The organic compound layer 4 has a hole injection layer 41, a hole transport layer 42, a first light-emitting layer 43, a second light-emitting layer 44, and an electron transport layer 45.

The second electrode 5 may be a transparent electrode, a reflection electrode, or a semi-transmittable electrode.

The protective layer 6 reduces the permeation of the moisture into the organic compound layer. Although the protective layer is shown as one layer, it may be a plurality of layers. Each layer may be an inorganic compound layer or an organic compound layer.

The color filter 7 is divided into 7R, 7G, and 7B according to the color. The color filter may be formed on a planarization film not shown. Further, a resin protective layer not shown may be included on the color filter. Further, the color filter may be formed on the protective layer 6. Alternatively, the color filter may be provided on an opposing substrate such as a glass substrate, followed by bonding together.

Embodiment 2

Figure 19:
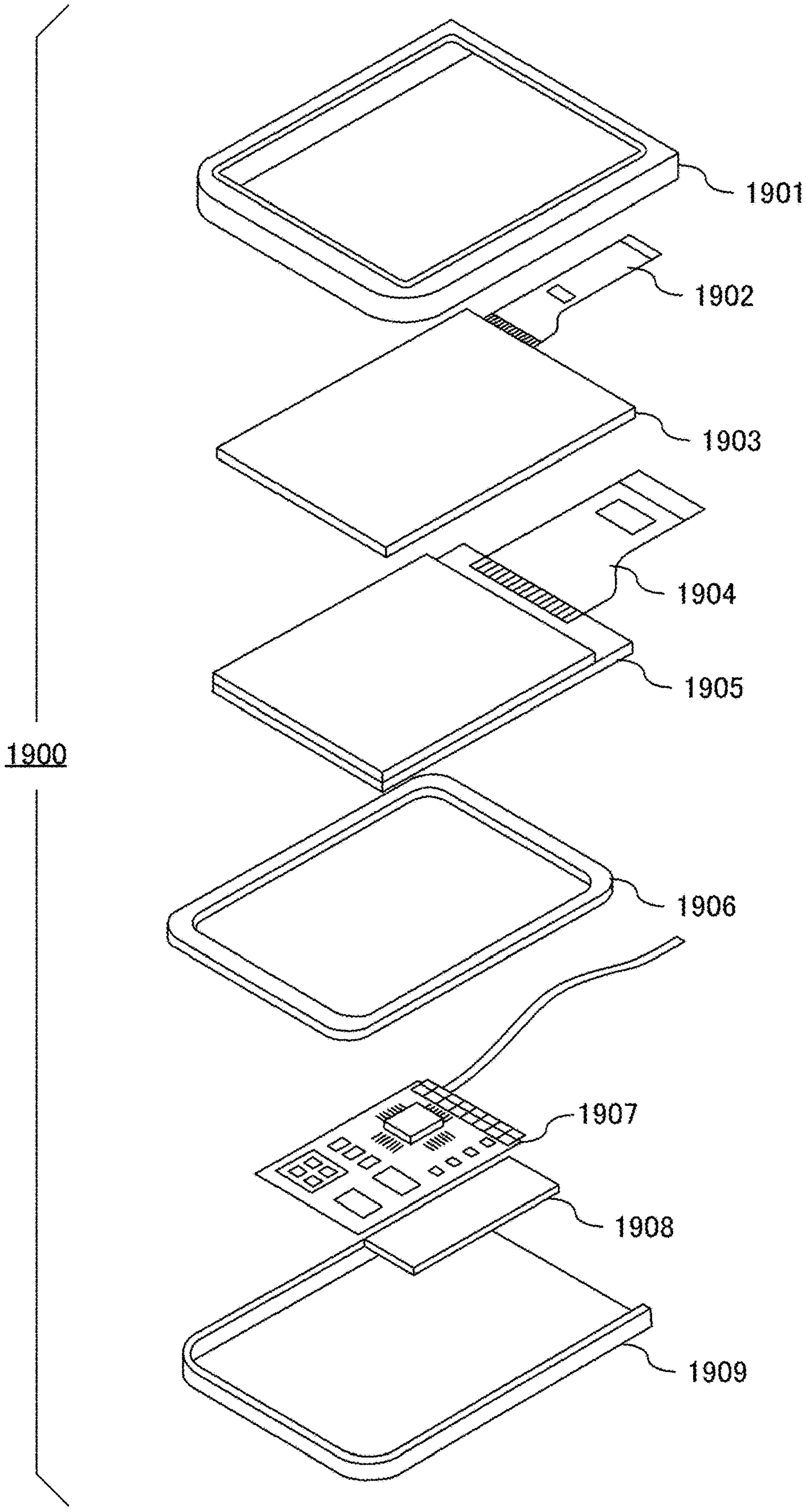
FIG. 19 is a schematic view showing one example of a display component.

FIG. 19 is a schematic view showing one example of a display component in accordance with Embodiment 2. A display apparatus 1900 may have a touch panel 1903, a display panel 1905, a frame 1906, a circuit substrate 1907, and a battery 1908 between an upper cover 1901 and a lower cover 1909. Flexible print circuits FPC 1902 and 1904 are connected with the touch panel 1903 and the display panel 1905.

The display panel 1905 has the display apparatus of Embodiment 1. A transistor is printed on the circuit substrate 1907. The battery 1908 is not required to be provided unless a display component is used for portable equipment, or may be provided at a different position even when used for portable equipment.

A display component in accordance with Embodiment 2 may have color filters having red, green, and blue. The color filters may be configured such that the red, green, and blue are arranged in the delta arrangement.

The display component in accordance with Embodiment 2 may be used for the display portion of the portable terminal. In that case, the display component may have both of the display function and the operation function. As the portable terminals, mention may be made of a mobile phone such as a smartphone, a tablet, a head mount display, and the like.

The display component in accordance with Embodiment 2 may be used for the display portion of an image pick-up device having an optical portion having a plurality of lenses, and an image pick-up element (imaging element) for receiving a light that has passed through the optical portion. The image pick-up device may have a display portion for displaying the information acquired by the image pick-up element. Further, the display portion may be a display portion exposed to the outside of the image pick-up device, or a display portion arranged in a finder. The image pick-up device may be a digital camera, or a digital video camera.

Embodiment 3

Figure 20A:
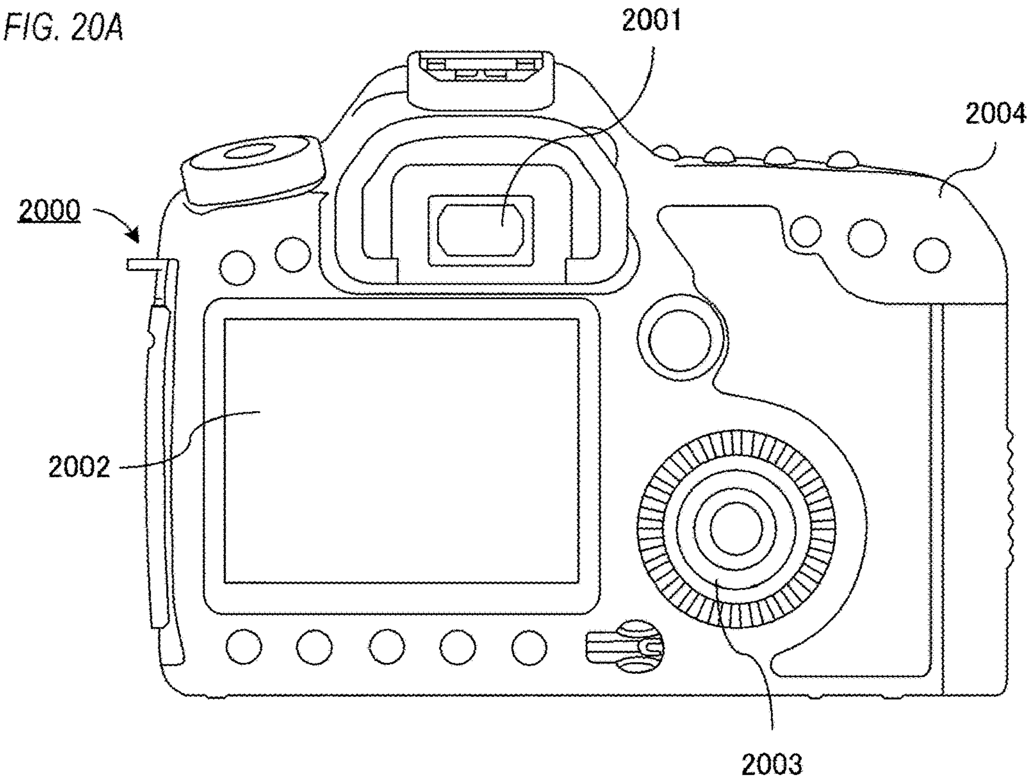
FIG. 20A is a schematic view showing one example of an image pick-up device.

FIG. 20A is a schematic view showing one example of an image pick-up device in accordance with Embodiment 3. An image pick-up device 2000 may have a view finder 2001, a back surface display 2002, an operation portion 2003, and a housing 2004. The view finder 2001 may have the display apparatus in accordance with Embodiment 1. In that case, the display apparatus may display not only an image to be picked up, but also environmental information, an image pick-up instruction, or the like. The environmental information may be the intensity of an outside light, the direction of an outside light, the moving speed of the object, the possibility of the object being shielded by a shield, or the like.

The timing preferable for image pick-up is a short amount of time. For this reason, it is better to display information as soon as possible. Therefore, a display apparatus using an organic light-emitting element is preferably used. This is because the organic light-emitting element is fast in response speed. When the display speed is required, the display apparatus using an organic light-emitting element can be more preferably used than a liquid crystal display apparatus.

The image pick-up device 2000 has an optical portion not shown. The optical portion has a plurality of lenses, and forms an image on the image pick-up element accommodated in the housing 2004. The plurality of lenses can be adjusted in focus by adjusting the relative position thereof. This operation can also be automatically performed. The image pick-up device may also be referred to as a photoelectric conversion device. The photoelectric conversion device can include, not sequential image pick-up, but the method for detecting the difference from the previous image, the method for cutting out an image from the normally recorded images, or the like as the image pick-up method.

Embodiment 4

Figure 20B:
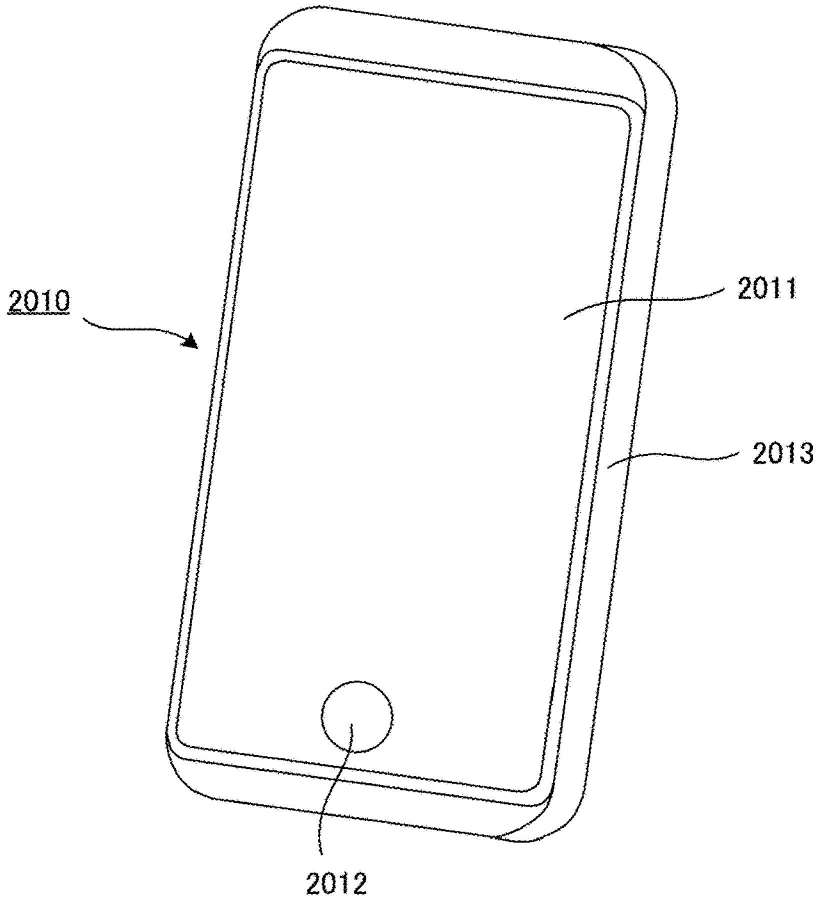
FIG. 20B is a schematic view showing one example of electronic equipment.

FIG. 20B is a schematic view showing one example of electronic equipment in accordance with Embodiment 4. Electronic equipment 2010 has a display portion 2011, an operation portion 2012, and a housing 2013. The housing 2013 may have a circuit, a print substrate having the circuit, a battery, and a communication portion.

The display portion 2011 may have the display apparatus in accordance with Embodiment 1. The operation portion 2012 may be a button, or may be the reaction portion of a touch-panel system. The operation portion may be a biometric recognition portion of recognizing the fingerprint, and performing unlocking, or the like. The electronic equipment having the communication portion can also be referred to as communication equipment. The electronic equipment may further have a camera function by including a lens and an image pick-up element. The image picked up by the camera function is projected on the display portion. As the electronic equipment, mention may be made of a smartphone, a note personal computer, or the like.

Embodiment 5

Figure 21A:
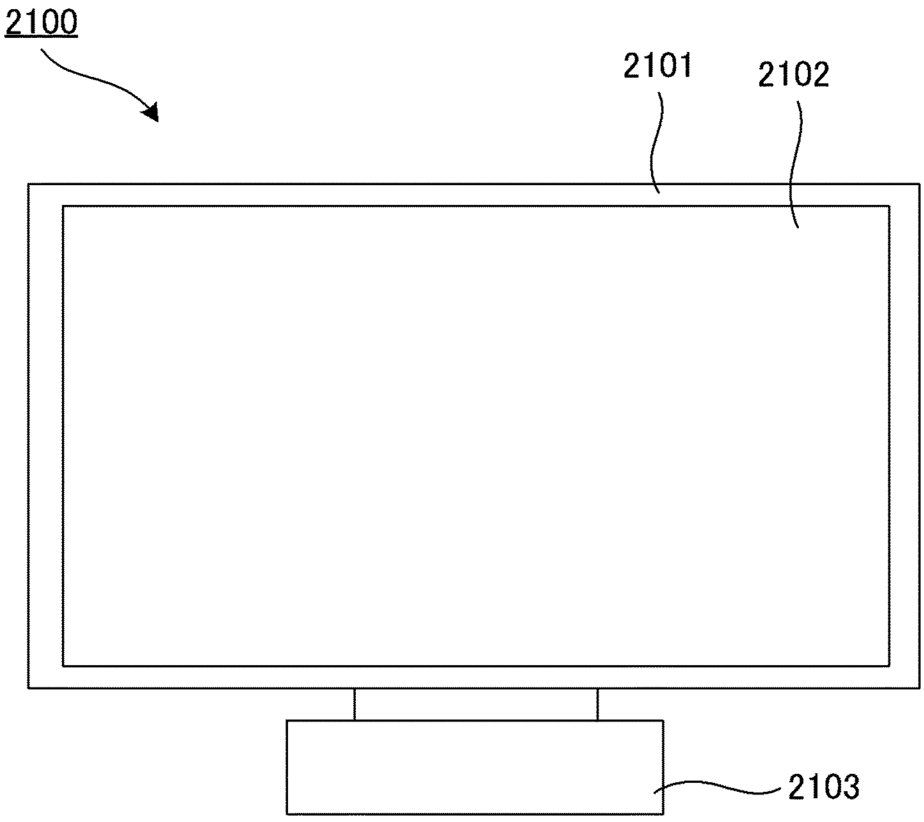
FIGS. 21A and 21B are each a schematic view showing one example of an image display apparatus.

FIG. 21A is a schematic view showing one example of an image display apparatus (monitor) in accordance with Embodiment 5. The image display apparatus 2100 of FIG. 21A is a television monitor, a PC monitor, or the like. The image display apparatus 2100 has a frame 2101, and a display portion 2102 surrounded by the frame 2101. The display portion 2102 may have the display apparatus in accordance with Embodiment 1.

The image display apparatus 2100 further has the frame 2101, and a base 2103 for supporting the display portion 2102. The base 2103 is not limited to the aspect of FIG. 21A. For example, the lower side of the frame 2101 may serve as the base.

Further, the frame 2101 and the display portion 2102 may be bent. The curvature radius may be at least 5000 mm and not more than 6000 mm.

Figure 21B:
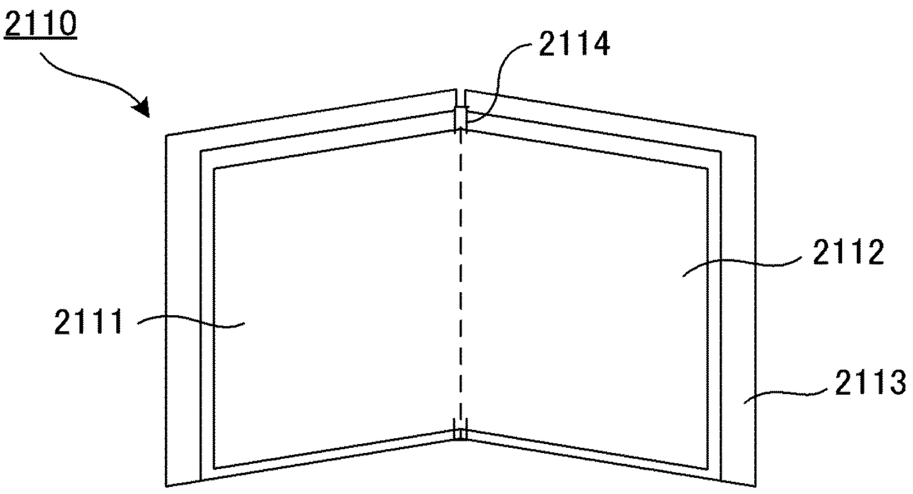

FIG. 21B is a schematic view showing another example of the image display apparatus in accordance with Embodiment 6. An image display apparatus 2110 of FIG. 21B is configured foldably, and is a so-called foldable image display apparatus. The image display apparatus 2110 has a first display portion 2111, a second display portion 2112, a housing 2113, and a folding point 2114. The first display portion 2111 and the second display portion 2112 may have the display apparatus in accordance with Embodiment 1. The first display portion 2111 and the second display portion 2112 may be one seamless sheet of image display apparatus. The first display portion 2111 and the second display portion 2112 can be divided at the folding point. The first display portion 2111 and the second display portion 2112 may display different images, respectively, or the first and second display portions may display one image.

Embodiment 6

Figure 22A:
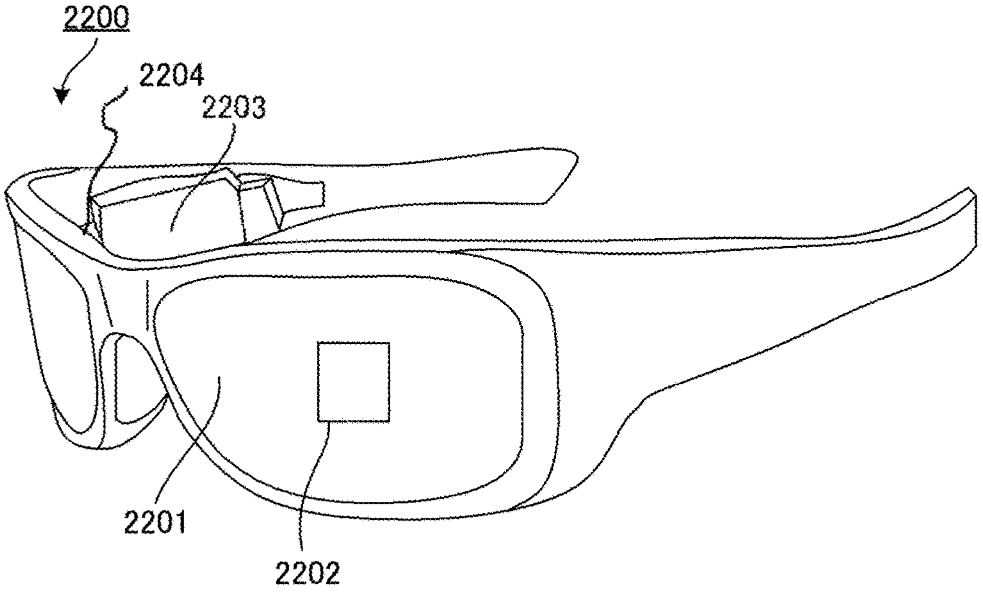
FIGS. 22A and 22B are each a schematic view showing one example of glasses.
Figure 22B:
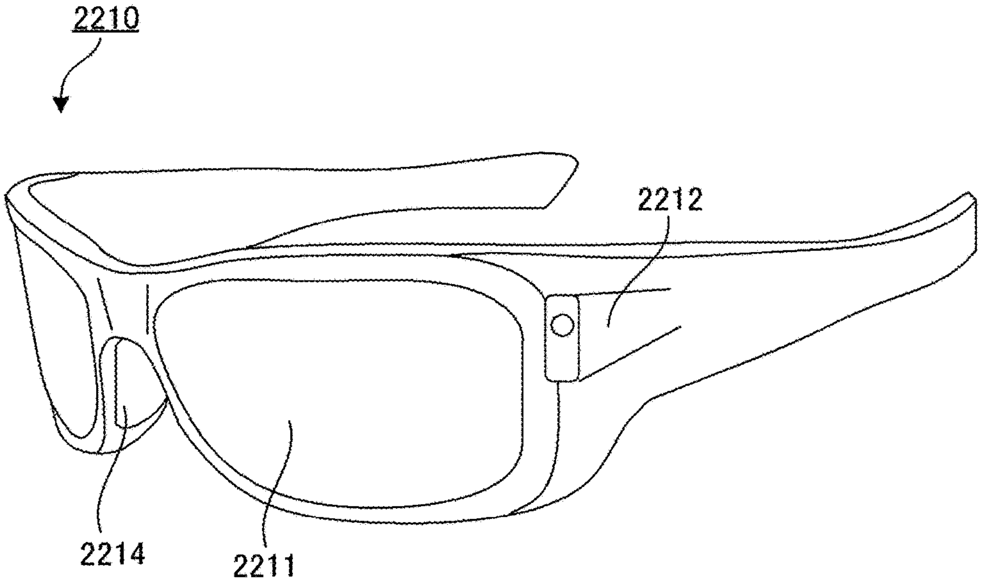

Referring to FIGS. 22A and 22B, a description will be given to an applied example of the display apparatus of Embodiment 1. The display apparatus is applicable to, for example, a system mountable as a wearable device such as smart glasses, a HMD, or a smart contact. The image pick-up device or the display apparatus for use in such applied examples can be configured as an image pick-up device capable of photoelectrically converting a visible light, and a display apparatus capable of emitting a visible light.

FIG. 22A illustrates glasses 2200 (smart glasses) in accordance with one applied example. On the surface side of the lens 2201 of the glasses 2200, the image pick-up device 2202 such as a CMOS sensor or a SPAD is provided. Further, on the back surface side of the lens 2201, the display apparatus 2204 in accordance with Embodiment 1 is provided.

The glasses 2200 further includes a control device 2203. The control device 2203 functions as a power supply for supplying an electric power to the image pick-up device 2202 and the display apparatus 2204. Further, the control device 2203 controls the operations of the image pick-up device 2202 and the display apparatus 2204. At the lens 2201, an optical system for condensing a light to the image pick-up device 2202 is formed.

FIG. 22B illustrates glasses 2210 (smart glasses) in accordance with one applied example. The glasses 2210 have a control device 2212. Onto the control device 2212, an image pick-up device corresponding to the image pick-up device 2202 and a display apparatus 2214 corresponding to the display apparatus 2204 are mounted. At the lens 2211, an optical system for projecting a light emitted from the display apparatus 2214 in the control device 2212 is formed, and an image is projected onto the lens 2211. The control device 2212 functions as a power supply for supplying an electric power to the image pick-up device and the display apparatus 2214, and controls the operations of the image pick-up device and the display apparatus 2214.

The control device 2212 may have a line-of-sight detection portion for detecting the line of sight of a wearer. For the detection of the line of sight, infrared radiation may be used. An infrared light-emitting portion emits an infrared light to the eyeballs of a user carefully looking at a display image. The image pick-up portion having a photo acceptance unit detects a reflected light from the eyeballs of the emitted infrared light, resulting in the picked-up image of the eyeballs. The provision of a reducing means for reducing the light to the display portion from the infrared light-emitting portion in a plan view reduces the reduction of the appearance of the image.

The line of sight of a user with respect to the display image is detected from the picked-up image of the eyeballs obtained by image pick-up of an infrared light. A given known method is applicable to the detection of the line of sight using the picked-up image of the eyeballs. As one example, the line-of-sight detection method on the basis of the Purkinje image due to reflection of an irradiation light at the cornea can be used.

More specifically, line-of-sight detection processing on the basis of the pupil cornea reflection method is performed. Using the pupil cornea reflection method, on the basis of the image of the pupil included in the picked-up image of the eyeballs, and the Purkinje image, the line-of-sight vector indicative of the orientation (rotation angle) of the eyeball is calculated, thereby detecting the line of sight of a user.

The glasses 2210 has an image pick-up device having a photo acceptance unit, and may control the display image of the display apparatus on the basis of the line-of-sight information of a user from the image pick-up device.

Specifically, the display apparatus 2214 determines a first display region looked at by a user, and a second display region other than the first display region on the basis of the line-of-sight information. The first display region and the second display region may be determined by the control device of the glasses 2210, or the one determined by an external control device may be received. In the display region of the display apparatus 2214, the display resolution of the first display region may be controlled higher than the display resolution of the second display region. In other words, the resolution of the second display region may be set lower than that of the first viewing region.

Further, the display region has a first display region and a second display region different from the first display region, and determines the region with a high priority from the first display region and the second display region on the basis of the line-of-sight information. The first viewing region and the second viewing region may be determined by the control device of the display apparatus, or the one determined by an external control device may be received. The resolution of the region with a high priority may be controlled higher than the resolution of the region other than the region with a high priority. In other words, the resolution of the region with a relatively lower priority may be set low.

Incidentally, for the determination of the first display region and the region with a high priority, AI may be used. AI may be a model configured so as to estimate the angle of the line of sight from the image of the eyeballs and the distance to the object beyond the line of sight, using the image of the eyeballs and the direction in which the eyeballs of the image were actually looking at as training data. The AI program may be possessed by the display apparatus, may be possessed by the image pick-up device, or may be possessed by an external device. When an external device has the AI program, transmission to the display apparatus via communication is achieved.

When display control is performed on the basis of visual recognition, the present invention is preferably applicable to smart glasses further having an image pick-up device for picking up an image of the outside. The smart glasses can display the picked-up outside information in real time.

Embodiment 7

Figure 23A:
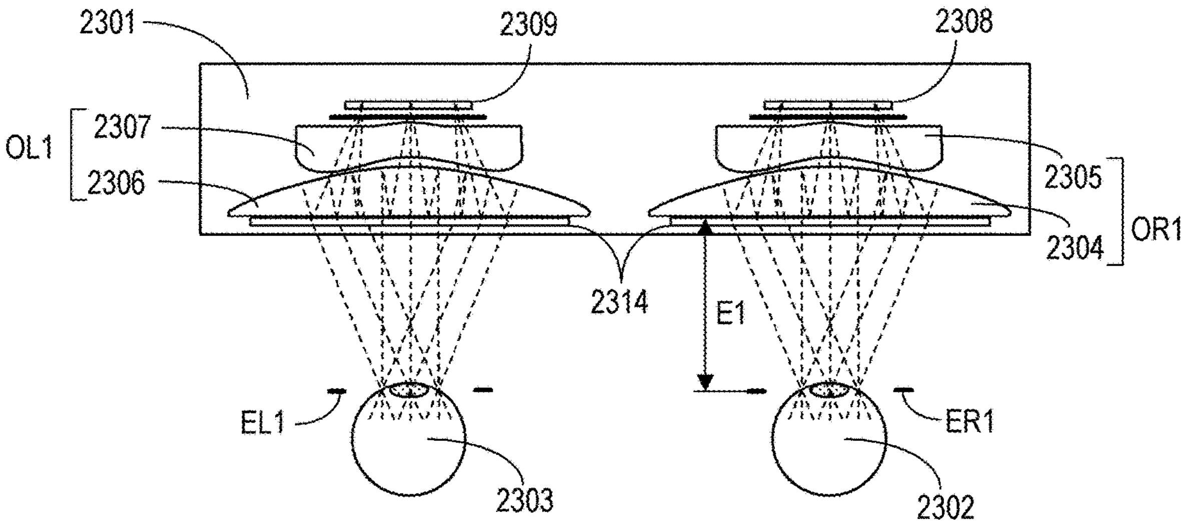
FIGS. 23A and 23B are each a schematic view showing one example of an image observation device.

FIG. 23A is a view showing the configuration of an HMD (head mount display) 2301 as an image observation device of Embodiment 7. The HMD 2301 is mounted on the head of an observer. A reference numeral 2302 represents the right eye of the observer, and a reference numeral 2303 represents the left eye of the observer. The display lenses 2304 and 2305 form a right-eye-ocular optical system OR1, and display lenses 2306 and 2307 form a left-eye-ocular optical system OL1. Each ocular optical system is a coaxial optical system formed of a plurality of (2) display lenses. The right eye 2302 of the observer is arranged at the exit pupil ER1 of the right-eye-ocular optical system OR1, and the left eye 2303 of the observer is arranged at the exit pupil EL1 of the left-eye-ocular optical system OL1. The exit pupil ER1 is provided at the position separated from the right-eye-ocular optical system OR1 by a distance E1. Similarly, the exit pupil EL1 is provided at the position separated from the left-eye-ocular optical system OL1 by the distance E1. The surface (the surface on the right eye 2302 side) of the right-eye-ocular optical system OR1, and the surface (the surface on the left eye 2303 side) of the left-eye-ocular optical system OL1 are each provided with an optical film 2314 for lens protection, condensation of light, or the like.

Figure 23B:
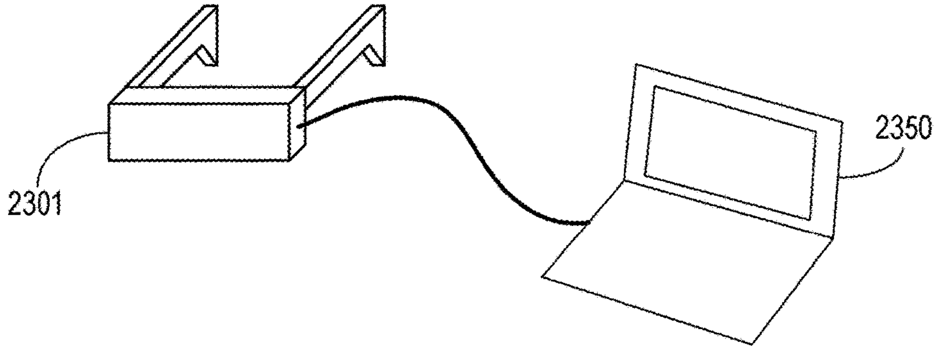

A reference numeral 2308 and a reference numeral 2309 represents the display apparatuses for the right eye and for the left eye, respectively. The display apparatuses may be the display apparatuses in accordance with Embodiment 1. FIG. 23B is a view showing each outward appearance of an HMD 2301, and a personal computer 2350 connected therewith. Each display apparatus displays a display image (original image) corresponding to the image signal outputted from the personal computer 2350. In this aspect, wired connection or wireless connection may be established. Further, the HMD 2301 may be a device internally mounting an image processing device, and operating stand-alone.

The ocular optical systems OR1 and OL1 guide the lights from the display apparatuses 2308 and 2309 to the exit pupils ER1 and EL1, respectively, and thereby projecting an enlarged virtual image of the display image onto the right eye 2302 and the left eye 2303 of the observer. As a result of this, the observer can observe the (virtual image of) the display image displayed on the display apparatuses 2308 and 2309 through the ocular optical systems OR1 and OL1.

Although not shown, the HMD 2301 may have a control device. The control device functions as a power supply for supplying an electric power to the display apparatuses 2308 and 2309, and controls the operations of the display apparatuses 2308 and 2309.

The control device may have a line-of-sight detection portion for detecting the line of sight of a wearer. For the detection of the line of sight, infrared radiation may be used. The infrared light-emitting portion emits an infrared light to the eyeballs of a user who carefully looks at the display image. The reflected light from the eyeballs of the emitted infrared light is detected by the image pick-up portion having the photo acceptance unit, thereby obtaining the picked-up image of the eyeball. The possession of a reducing means for reducing the light to the display portion from the infrared light-emitting portion in a plan view reduces the reduction of the appearance of the image.

The line of sight of a user with respect to the display image from the picked-up image of the eyeball obtained from the image pick-up of an infrared light is detected. To the detection of the line of sight using the picked-up image of the eyeball, a given known method is applicable. As one example, the line-of-sight detection method on the basis of the Purkinje image by reflection of an irradiation light at the cornea can be used.

More specifically, line-of-sight detection processing on the basis of the pupil cornea reflection method is performed. Using the pupil cornea reflection method, on the basis of the image of the pupil included in the picked-up image of the eyeball and the Purkinje image, the line-of-sight vector indicative of the orientation (rotation angle) of the eyeball is calculated, thereby detecting the line of sight of a user.

Specifically, the display apparatuses 2308 and 2309 determine a first display region carefully looked at by a user, and a second display region other than the first display region on the basis of the line-of-sight information. The first display region and the second display region may be determined by the control device, or the one determined by an external control device may be received. In the display regions of the display apparatuses 2308 and 2309, the display resolution of the first display region may be controlled higher than the display resolution of the second display region. In other words, the resolution of the second display region may be set lower than that of the first viewing region.

Further, the display region has a first display region and a second display region different from the first display region, and determines the region with a high priority from the first display region and the second display region on the basis of the line-of-sight information. The first viewing region and the second viewing region may be determined by the control device of the display apparatus, or the one determined by an external control device may be received. The resolution of the region with a high priority may be controlled higher than the resolution of the region other than the region with a high priority. In other words, the resolution of the region with a relatively lower priority may be set low.

Incidentally, for the determination of the first display region and the region with a high priority, AI may be used. AI may be a model configured so as to estimate the angle of the line of sight from the image of the eyeballs and the distance to the object beyond the line of sight, using the image of the eyeballs and the direction in which the eyeballs of the image were actually looking at as training data. The AI program may be possessed by the display apparatus, may be possessed by the image pick-up device, or may be possessed by an external device. When an external device has the AI program, transmission to the display apparatus is achieved via communication.

Thus, the display apparatus in accordance with Embodiment 1 is applicable to various display components, image pick-up devices, electronic equipment, image display apparatuses in accordance with the present embodiment.

The embodiments described up to this point can be appropriately changed within the scope not departing from the technical idea. Incidentally, the disclosure of the present specification includes not only the description in the present specification but also all the matters that can be grasped from the present specification and the drawings attached to the present specification.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-073709, filed on Apr. 30, 2024, which is hereby incorporated by reference herein in its entirety.

What is claimed is:

1. A display apparatus comprising:

a substrate;

a plurality of pixels arranged in a display region on the substrate; and a control circuit configured to control a signal to be supplied to the pixel, wherein the display region includes (1) a first region and (2) a second region surrounding the first region, wherein a part of the first region is set as a third region changeable in position, wherein the signal to be supplied to the pixel is controlled so that a display resolution of a fourth region, which is not the third region, in the first region becomes lower than a display resolution of the third region, wherein a display resolution of the second region is set to a value equal to or lower than the display resolution of the fourth region by a circuit configuration of the pixel, and wherein a density of the pixels in the third region is the same as a density of the pixels in the fourth region.

2. The display apparatus according to claim 1, wherein the display resolution of the second region is set to a value equal to or lower than the display resolution of the fourth region by a number of light-emitting elements connected with a circuit of a pixel of the second region being larger than a number of light-emitting elements connected with a circuit of a pixel of the fourth region.

3. The display apparatus according to claim 1, wherein a plurality of light-emitting elements are uniformly arranged in the display region, and wherein each of the plurality of pixels includes one or more light-emitting elements.

4. The display apparatus according to claim 3, wherein the plurality of light-emitting elements are arranged in a matrix including a row direction and a column direction, wherein to each of the plurality of light-emitting elements, a vertical scanning signal line arranged in the row direction, and a horizontal scanning signal line arranged in the column direction are connected, and wherein in the second region, light-emitting elements adjacent in the row direction are connected with a same horizontal scanning signal line.

5. The display apparatus according to claim 4, wherein each of the plurality of pixels includes a plurality of subpixels having different luminescent colors, and wherein all of two or more light-emitting elements to be connected with a same horizontal scanning signal line are light-emitting elements for emitting a first color.

6. The display apparatus according to claim 3, wherein to each of the plurality of light-emitting elements, a vertical scanning signal line and a horizontal scanning signal line are connected, wherein the vertical scanning signal line includes a write control line and a light-emitting control line, wherein each of the plurality of pixels includes one or more light-emitting elements, driving transistors, writing transistors, and light-emitting control transistors, wherein the write control line is connected with a gate of the writing transistor, wherein the light-emitting control line is connected with a gate of the light-emitting control transistor, wherein the horizontal scanning signal line is connected with one of a source or a drain of the writing transistor, wherein another of the source or the drain of the writing transistor is connected with a gate of the driving transistor, wherein one of a source and a drain of the driving transistor is connected with the light-emitting element, wherein another of the source and the drain of the driving transistor is connected with one of a source and a drain of the light-emitting control transistor, and wherein another of the source and the drain of the light-emitting control transistor is connected with a power supply.

7. The display apparatus according to claim 6, wherein in the second region, two or more adjacent light-emitting elements are provided with one writing transistor, wherein the two or more adjacent light-emitting elements are provided with two or more respectively corresponding driving transistors, and wherein the another of the source or the drain of the writing transistor is connected with gates of the two or more driving transistors.

8. The display apparatus according to claim 6, wherein in the second region, two or more adjacent light-emitting elements are provided with two or more respectively corresponding writing transistors, and wherein the ones of the source or the drain of the two or more writing transistors are connected with a same horizontal scanning signal line.

9. The display apparatus according to claim 3, wherein each of the plurality of light-emitting elements is connected with a vertical scanning signal line and a horizontal scanning signal line, and wherein in the fourth region, a same horizontal scanning signal is supplied to two or more adjacent light-emitting elements.

10. The display apparatus according to claim 3, wherein the plurality of light-emitting elements are arranged in a matrix including a row direction and a column direction, wherein each of the plurality of light-emitting elements is connected with a vertical scanning signal line arranged in the row direction and a horizontal scanning signal line arranged in the column direction, wherein in a region where the third region is not present in the row direction, vertical scanning signals are sequentially supplied to light-emitting elements on a per-a-plurality-of-lines basis, and wherein in a region where the third region is present in the row direction, vertical scanning signals are sequentially supplied to the light-emitting elements on a per-line basis.

11. The display apparatus according to claim 1, wherein the display region further includes a fifth region surrounding the second region, and wherein a display resolution of the fifth region is set to a value lower than a display resolution of the third region by a circuit configuration of the pixel.

12. The display apparatus according to claim 1, further comprising a line-of-sight detection portion, wherein the control circuit sets the third region on a basis of a detection result of the line-of-sight detection portion.

13. The display apparatus according to claim 1, further comprising an imaging element, wherein the control circuit sets a region where a predetermined object in an image captured by the imaging element is displayed as the third region.

14. The display apparatus according to claim 13, wherein the control circuit detects the predetermined object from the image captured by the imaging element by using a discrimination circuit using a learned model.

15. The display apparatus according to claim 1, comprising a region specifying circuit, wherein the control circuit sets the third region on a basis of information of the region specifying circuit.

16. A photoelectric conversion device comprising:

an optical member;

an imaging element configured to receive a light that has passed through the optical member; and a display apparatus configured to display an image captured by the imaging element, wherein the display apparatus is the display apparatus according to claim 1.

17. Electronic equipment comprising:

the display apparatus according to claim 1;

a housing provided with the display apparatus; and a communication circuit provided at the housing, and configured to communicate with the outside.

18. The display apparatus according to claim 1, wherein a density of pixel circuits in the second region is lower than a density of pixel circuits in the first region.

19. The display apparatus according to claim 7, wherein voltages written to the gates of the driving transistors, which are respectively connected to the light-emitting elements adjacent to each other in the row direction, are the same.

* * * * *